United States Patent
Miwa et al.

(10) Patent No.: US 11,294,053 B2
(45) Date of Patent: Apr. 5, 2022

(54) OBJECT DETECTION DEVICE

(71) Applicant: AISIN SEIKI KABUSHIKI KAISHA, Kariya (JP)

(72) Inventors: Nobuyasu Miwa, Kariya (JP); Kosuke Tsukao, Kariya (JP); Kaoru Nakagaki, Kariya (JP); Tsubasa Kamiya, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 248 days.

(21) Appl. No.: 16/747,601

(22) Filed: Jan. 21, 2020

(65) Prior Publication Data
US 2020/0256989 A1 Aug. 13, 2020

(30) Foreign Application Priority Data

Feb. 8, 2019 (JP) .............................. JP2019-021927

(51) Int. Cl.
*G01S 15/931* (2020.01)
*G01S 15/87* (2006.01)
(Continued)

(52) U.S. Cl.
CPC .............. *G01S 15/931* (2013.01); *G01S 7/54* (2013.01); *G01S 15/08* (2013.01); *G01S 15/876* (2013.01)

(58) Field of Classification Search
CPC .......... G01S 15/931; G01S 7/54; G01S 15/08; G01S 15/876
(Continued)

(56) References Cited

U.S. PATENT DOCUMENTS 8,503,265 B2 * 8/2013 Akiyama ................ G01S 15/46
367/93
2002/0191837 A1 * 12/2002 Takeda ............... G06K 9/00805
382/154
(Continued)

FOREIGN PATENT DOCUMENTS

| JP | 07-092263 A | 4/1995 |
|---|---|---|
| JP | 4880712 B2 | 2/2012 |
| JP | 2017-015494 A | 1/2017 |

OTHER PUBLICATIONS

U.S. Appl. No. 16/660,862, filed Oct. 23, 2019, Nakagaki, K, et al.
(Continued)

*Primary Examiner* — Kerri L McNally
(74) *Attorney, Agent, or Firm* — Oblon, McClelland, Maier & Neustadt, L.L.P.

(57) ABSTRACT

An object detection device includes: first and second transmission/reception units spaced apart from each other and configured to transmit an exploration wave and receive the exploration wave reflected by an object; and a processing unit configured to calculate a position of the object based on reception results by the first and second transmission/reception units. The processing unit includes: a distance processing unit configured to calculate first and second points based on the reception results, and calculates a separation distance between the first and second points; a position calculation unit configured to calculate the position based on the first and second points; a reflection intensity processing unit configured to calculate a reflection intensity indicating an intensity of the exploration wave received by the first and second transmission/reception units; and a position correction unit configured to correct the position based on the separation distance and the reflection intensity.

4 Claims, 19 Drawing Sheets

(51) Int. Cl.
  *G01S 7/54* (2006.01)
  *G01S 15/08* (2006.01)
(58) Field of Classification Search
  USPC .......................................................... 367/93
  See application file for complete search history.

(56) References Cited

U.S. PATENT DOCUMENTS

| | | | |
|---|---|---|---|
| 2006/0013438 A1* | 1/2006 | Kubota | G06K 9/00805 382/103 |
| 2007/0219720 A1* | 9/2007 | Trepagnier | G05D 1/0278 701/300 |
| 2008/0015777 A1* | 1/2008 | Heimberger | G01S 15/931 701/301 |
| 2014/0200801 A1* | 7/2014 | Tsuruta | B60W 30/10 701/400 |
| 2016/0157828 A1* | 6/2016 | Sumi | G01N 29/262 702/189 |
| 2018/0328742 A1* | 11/2018 | Asai | G01C 21/14 |

OTHER PUBLICATIONS

U.S. Appl. No. 16/660,866, filed Oct. 23, 2019, Kamiya, T, et al.

* cited by examiner

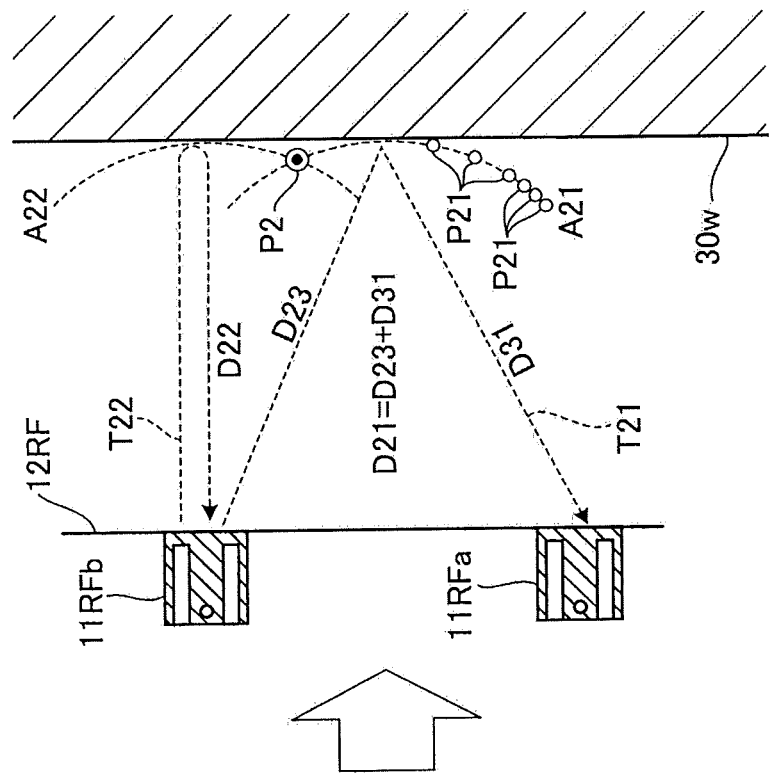
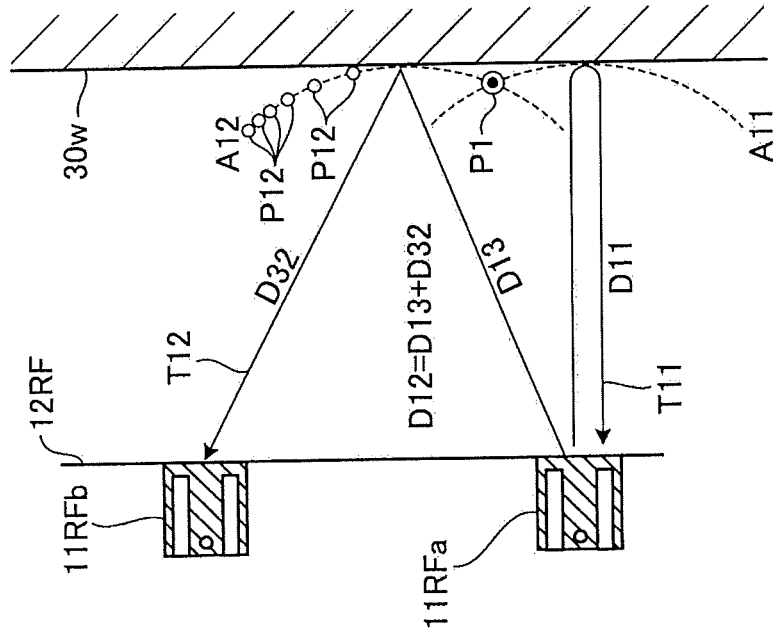

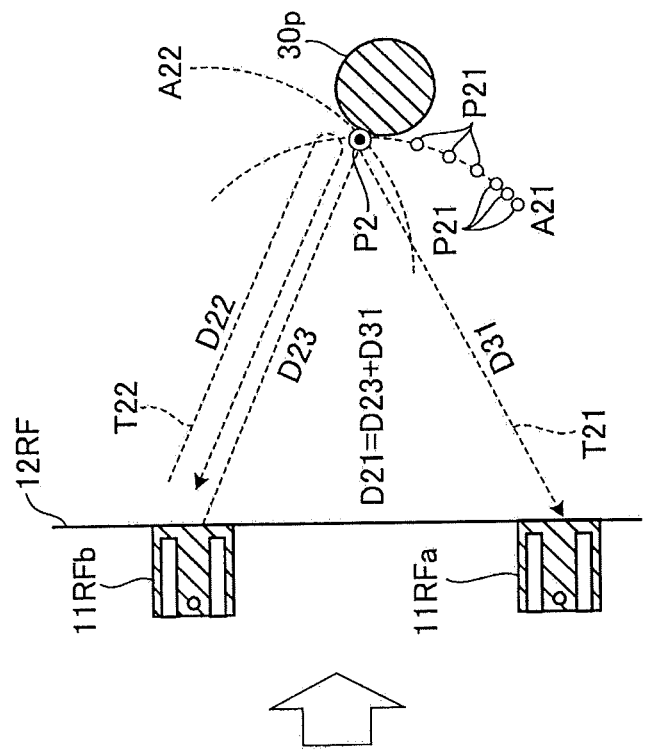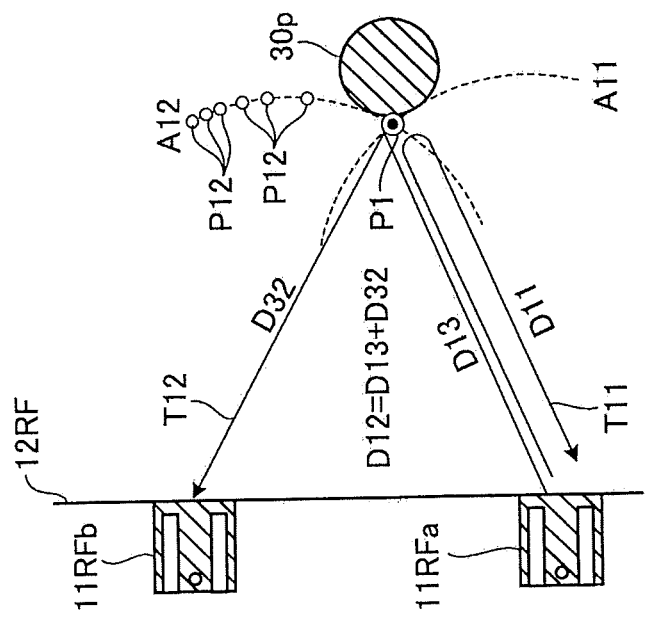

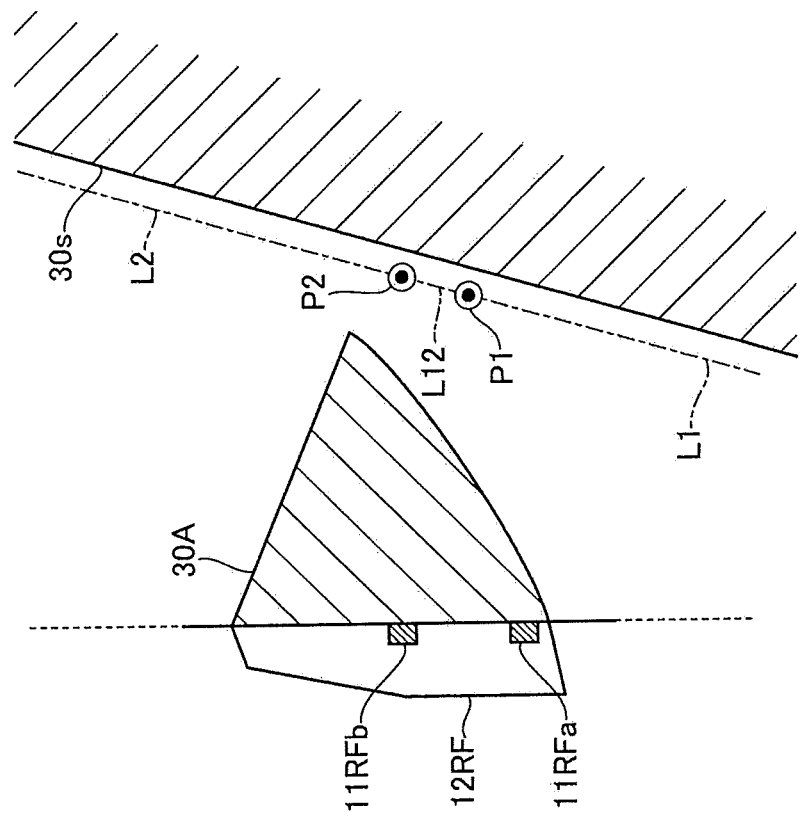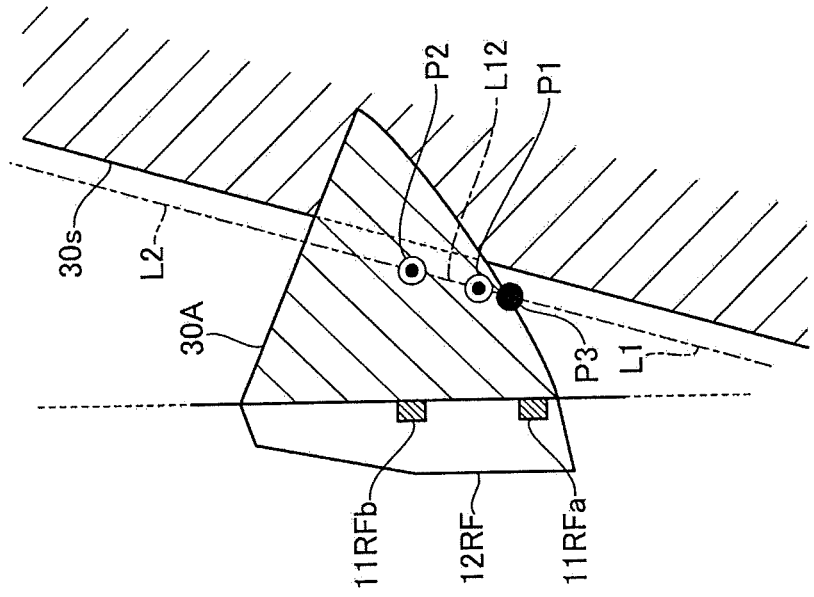

OBJECT DETECTION DEVICE

CROSS REFERENCE TO RELATED APPLICATIONS

This application is based on and claims priority under 35 U.S.C. § 119 to Japanese Patent Application 2019-021927, filed on Feb. 8, 2019, the entire contents of which are incorporated herein by reference.

TECHNICAL FIELD

Embodiments of this disclosure relate to an object detection device.

BACKGROUND DISCUSSION

In the related art, there has been known a technology of calculating the position of an object by transmitting an exploration wave such as an ultrasonic wave to the object and receiving and arithmetically operating the exploration wave reflected by the object (see, e.g., JP 4880712B (Reference 1) and JP 07-092263A (Reference 2)).

However, the technology in the related art has a problem that the accuracy of position calculation may be low according to the position of the object.

Thus, a need exists for an object detection device which is not susceptible to the drawback mentioned above.

SUMMARY

An object detection device according to an aspect of this disclosure includes, for example, a first transmission/reception unit and a second transmission/reception unit spaced apart from each other by a predetermined distance in a horizontal direction and configured to transmit an exploration wave and receive the exploration wave reflected by an object and a processing unit configured to calculate a position of the object based on a reception result by the first transmission/reception unit and a reception result by the second transmission/reception unit, in which the processing unit includes a distance processing unit configured to calculate a first point based on the reception result by the first transmission/reception unit and the reception result by the second transmission/reception unit when the first transmission/reception unit transmits the exploration wave, calculate a second point based on the reception result by the first transmission/reception unit and the reception result by the second transmission/reception unit when the second transmission/reception unit transmits the exploration wave, and calculates a separation distance between the first point and the second point, a position calculation unit configured to calculate the position of the object based on the first point and the second point, a reflection intensity processing unit configured to calculate a reflection intensity indicating an intensity of the exploration wave received by the first transmission/reception unit and the second transmission/reception unit, and a position correction unit configured to correct the position of the object based on the separation distance and the reflection intensity. With this configuration, it is possible to improve the accuracy of object position calculation. Specifically, it is possible to appropriately correct the calculated object position based on the separation distance between the first point and the second point and the reflection intensity of the exploration wave.

BRIEF DESCRIPTION OF THE DRAWINGS

The foregoing and additional features and characteristics of this disclosure will become more apparent from the following detailed description considered with the reference to the accompanying drawings, wherein:

FIGS. 5A and 5B are schematic diagrams illustrating a state where multiple transmission/reception units of the first embodiment perform transmission and reception;

FIGS. 9A and 9B are schematic diagrams illustrating a state where multiple transmission/reception units of the first embodiment perform transmission and reception;

FIGS. 16A and 16B are schematic diagrams illustrating a state where the collision position between an object and a door is determined by the object detection unit of the first embodiment;

DETAILED DESCRIPTION

Hereinafter, exemplary embodiments (a first embodiment and a second embodiment) disclosed here will be described. Configurations of the embodiments described below and actions, results, and effects provided by the configurations are examples. This disclosure may be realized by configurations other than those disclosed in the following embodiments and may obtain at least one of various effects based on a basic configuration and derivative effects.

First Embodiment

Figure 1:
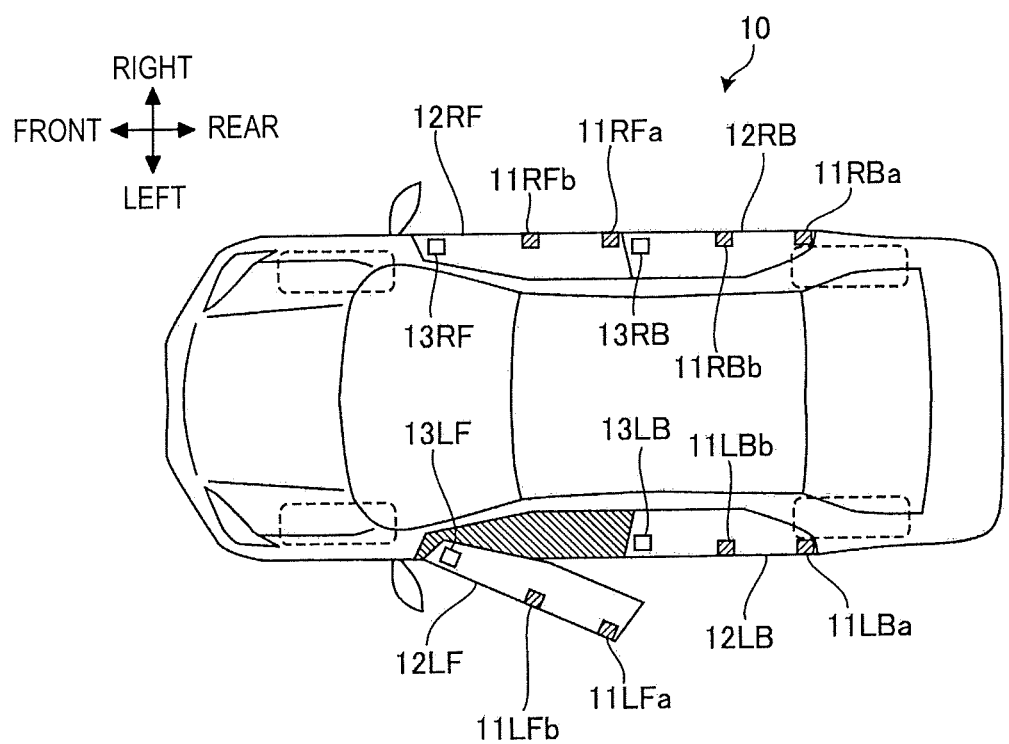
FIG. 1 is a plan view of a vehicle on which an object detection device of a first embodiment is mounted as viewed from above.

FIG. 1 is a plan view of a vehicle 10 on which an object detection device of a first embodiment is mounted as viewed from above. The directions indicated by the upper left arrows in FIG. 1 are referred to as the longitudinal direction and the transverse direction of the vehicle 10.

As illustrated in FIG. 1, in the vehicle 10 on which an object detection device is mounted, multiple transmission/reception units 11RFa, 11RFb, 11RBa, 11RBb, 11LFa, 11LFb, 11LBa, and 11LBb included in the object detection device are provided, for example, on decorative plates of respective doors (opening/closing units that are opened and closed) 12RF, 12RB, 12LF and 12LB of the vehicle 10.

The transmission/reception unit 11RFa is provided, for example, in the vicinity of the opening/closing side end of the right front door 12RF. The vertical position of the transmission/reception unit 11RFa may be set to the lower side position of the door 12RF by fitting the transmission/reception unit 11RFa into the decorative plate below the door 12RF. Alternatively, the vertical position of the transmission/reception unit 11RFa may be set to a center position with respect to the upper and lower ends of the door 12RF or the position shifted to the outermost side of the door 12RF. The transmission/reception unit 11RFb is provided, for example, closer to the front of the vehicle 10 than the transmission/reception unit 11RFa of the door 12RF and is spaced apart from the transmission/reception unit 11RFa by a predetermined distance. For example, the vertical position of the transmission/reception unit 11RFb is equal to the vertical position of the transmission/reception unit 11RFa. That is, the transmission/reception unit 11RFb (an example of a first transmission/reception unit) and the transmission/reception unit 11RFa (an example of a second transmission/reception unit) are spaced apart from each other by a predetermined distance in the horizontal direction. Further, the transmission/reception units 11LFa and 11LFb are provided, for example, at positions corresponding to the respective transmission/reception units 11RFa and 11RFb of the left front door 12LF.

The transmission/reception unit 11RBa is provided, for example, in the vicinity of the opening/closing side end of the right rear door 12RB. The vertical position of the transmission/reception unit 11RBa may be set to the lower side position of the door 12RB by fitting the transmission/reception unit 11RFa into the decorative plate below the door 12RB. Alternatively, the vertical position of the transmission/reception unit 11RBa may be set to a center position with respect to the upper and lower ends of the door 12RB or the position shifted to the outermost side of the door 12RB. The transmission/reception unit 11RBb is provided, for example, closer to the front of the vehicle 10 than the transmission/reception unit 11RBa of the door 12RB and is spaced apart from the transmission/reception unit 11RBa by a predetermined distance. For example, the vertical position of the transmission/reception unit 11RBb is equal to the vertical position of the transmission/reception unit 11RBa. That is, the transmission/reception unit 11RBb and the transmission/reception unit 11RBa are spaced apart from each other by a predetermined distance in the horizontal direction. The transmission/reception units 11LBa and 11LBb are provided, for example, at positions corresponding to the respective transmission/reception units 11RBa and 11RBb of the left rear door 12LB.

Hereinafter, when the multiple transmission/reception units 11RFa, 11RFb, 11RBa, 11RBb, 11LFa, 11LFb, 11LBa and 11LBb are not particularly distinguished, they are simply described as the transmission/reception unit 11. Further, when the multiple doors 12RF, 12RB, 12LF and 12LB are not particularly distinguished, they are simply described as door 12.

The transmission/reception unit 11 is a sensor or sonar that transmits an exploration wave such as an ultrasonic wave. Further, the transmission/reception unit 11 also functions as a receiver that receives the exploration wave reflected by an object. The transmission/reception unit 11 detects an object existing in the vicinity of each door 12 by transmitting and receiving the exploration wave around each door 12.

In the vehicle 10 on which the object detection device is mounted, further, multiple door opening degree adjustment units 13RF, 13RB, 13LF and 13LB included in the object detection device are provided, for example, inside outer panels of the respective doors 12RF, 12RB, 12LF and 12LB of the vehicle 10.

The door opening degree adjustment unit 13RF is provided, for example, in the vicinity of the hinge side end of the right front door 12RF. The door opening degree adjustment unit 13RB is provided, for example, in the vicinity of the hinge side end of the right rear door 12RB. The door opening degree adjustment unit 13LF is provided, for example, in the vicinity of the hinge side end of the left front door 12LF. The door opening degree adjustment unit 13LB is provided, for example, in the vicinity of the hinge side end of the left rear door 12LB.

Hereinafter, when the multiple door opening degree adjustment units 13RF, 13RB, 13LF and 13LB are not particularly distinguished, they are simply described as the door opening degree adjustment unit 13.

When an object that may be an obstacle exists in the vicinity of any one door 12, the door opening degree adjustment unit 13 adjusts the opening degree of the door 12 to avoid collision between the door 12 and the object.

Figure 2:
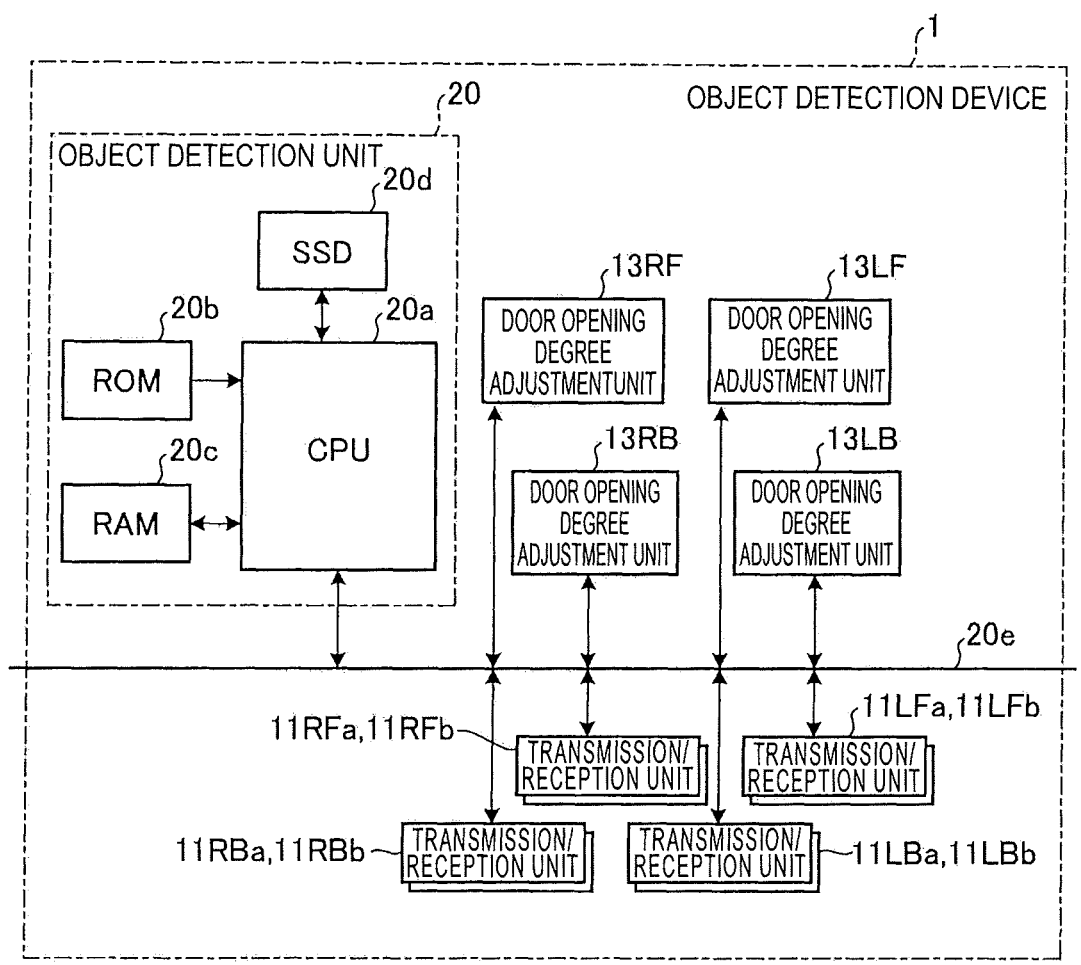
FIG. 2 is a block diagram illustrating a hardware configuration of the object detection device of the first embodiment.

FIG. 2 is a block diagram illustrating a hardware configuration of an object detection device 1 of the first embodiment. The object detection device 1 detects an object around each door 12 of the vehicle 10 based on the reception result and the like by the transmission/reception unit 11. When an object that may be an obstacle is detected, the object detection device 1 avoids collision with the object by the door opening degree adjustment unit 13.

As illustrated in FIG. 2, the object detection device 1 includes the multiple transmission/reception units 11RFa, 11RFb, 11RBa, 11RBb, 11LFa, 11LFb, 11LBa and 11LBb, the multiple door opening degree adjustment units 13RF, 13RB, 13LF and 13LB, an object detection unit 20, and an in-vehicle network 20e.

The multiple transmission/reception units 11 are connected to the in-vehicle network 20e to transmit transmission/reception information to the object detection unit 20 via the in-vehicle network 20*e*. The multiple door opening degree adjustment units 13 are connected to the in-vehicle network 20*e* to adjust the opening degree of each door 12 under the control of the object detection unit 20 via the in-vehicle network 20*e*.

The object detection unit 20 determines the presence of an object and the position of the object based on the transmission/reception information acquired from each of the multiple transmission/reception units 11. The object detection unit 20 outputs information on the detected object to the door opening degree adjustment unit 13 to prevent collision with the door 12.

The object detection unit 20 is a computer including a microcomputer such as an electronic control unit (ECU). The object detection unit 20 includes a central processing unit (CPU) 20*a*, a read only memory (ROM) 20*b*, a random access memory (RAM) 20*c*, and a solid state drive (SSD) 20*d*. In addition, the CPU 20*a*, the ROM 20*b*, and the RAM 20*c* may be integrated in the same package.

The CPU 20*a* is an example of a hardware processor that reads a program stored in a nonvolatile storage device such as the ROM 20*b* and executes various arithmetic processings and controls according to the program.

The ROM 20*b* stores each program and parameters necessary for executing the program. The RAM 20*c* temporarily stores various types of data used in arithmetic operations performed by the CPU 20*a*. The SSD 20*d* is a rewritable nonvolatile storage device, and maintains data even when the object detection unit 20 is powered off.

The in-vehicle network 20*e* is, for example, a controller area network (CAN). The in-vehicle network 20*e* electrically connects the multiple transmission/reception units 11, the multiple door opening degree adjustment units 13, and the object detection unit 20 to each other so that signals and information may be transmitted and received therebetween.

Figure 3:
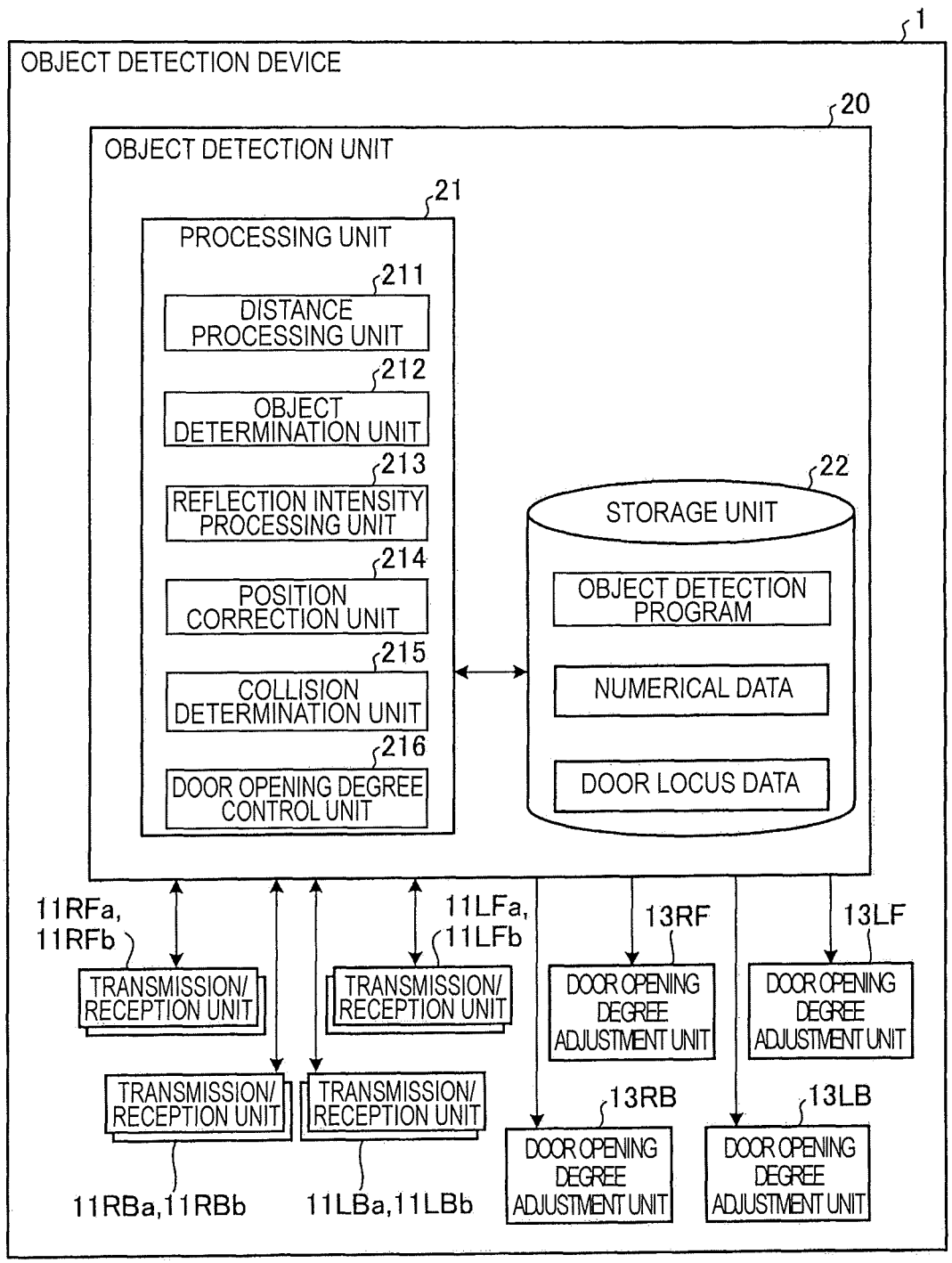
FIG. 3 is a block diagram illustrating functions of the object detection device of the first embodiment.

FIG. 3 is a block diagram illustrating functions of the object detection device 1 of the first embodiment. As illustrated in FIG. 3, the object detection unit 20 of the object detection device 1 includes a processing unit 21 and a storage unit 22.

The storage unit 22 stores a program executed by the processing unit 21 and data necessary for executing the program. For example, the storage unit 22 stores an object detection program executed by the processing unit 21. The storage unit 22 stores numerical data necessary for executing the object detection program. The storage unit 22 stores door locus data (an example of opening/closing locus data of an opening/closing unit) necessary for executing the object detection program.

The processing unit 21 calculates the position of an object based on the reception results by the multiple transmission/reception units 11. The processing unit 21 is realized as a function of, for example, the CPU 20*a*. The processing unit 21 includes a distance processing unit 211, an object determination unit 212, a reflection intensity processing unit 213, a position correction unit 214, a collision determination unit 215, and a door opening degree control unit 216. For example, the processing unit 21 functions as the respective units 211 to 216 by reading the object detection program stored in the storage unit 22. Further, some or all of the respective units 211 to 216 may be realized by hardware such as an application specific integrated circuit (ASIC) or a circuit including a field-programmable gate array (FPGA).

Hereinafter, when taking an example among the multiple transmission/reception units 11, the transmission/reception units 11RFa and 11RFb are mainly taken as an example, but the same is applied to the other transmission/reception units 11.

When the transmission/reception unit 11RFa transmits the exploration wave, the distance processing unit 211 calculates a first point based on the reception result by the transmission/reception unit 11RFa and the reception result by the transmission/reception unit 11RFb. When the transmission/reception unit 11RFb transmits the exploration wave, the distance processing unit 211 calculates a second point based on the reception result by the transmission/reception unit 11RFa and the reception result by the transmission/reception unit 11RFb. Further, the distance processing unit 211 calculates a separation distance between the first point and the second point. Further, the distance processing unit 211 determines whether or not the separation distance is equal to or greater than a predetermined separation distance threshold.

The object determination unit 212 (an example of a position calculation unit) determines the position and external shape of an object based on the information calculated by the distance processing unit 211. For example, the object determination unit 212 calculates the position of the object based on the first point and the second point.

The reflection intensity processing unit 213 calculates a reflection intensity indicating the intensity of the exploration wave received by the transmission/reception unit 11RFa and the transmission/reception unit 11RFb. Further, the reflection intensity processing unit 213 determines whether or not the reflection intensity is equal to or greater than a predetermined reflection intensity threshold.

The position correction unit 214 corrects the position of the object based on the determination result by the distance processing unit 211 and the determination result by the reflection intensity processing unit 213. Specifically, for example, the position correction unit 214 corrects the position of the object so that the distance to the object is reduced when the separation distance is equal to or greater than the predetermined separation distance threshold in the determination result by the distance processing unit 211 and when the reflection intensity is less than the predetermined reflection intensity threshold in the determination result by the reflection intensity processing unit 213. In this case, the amount by which the distance is reduced may be determined according to, for example, the magnitude of the reflection intensity or the distance to the object.

The collision determination unit 215 determines whether or not the opening/closing unit collides with the object when the opening/closing unit is opened and closed based on the position of the object and the opening/closing locus data. For example, when an object that may be an obstacle is detected in the vicinity of any one door 12, the collision determination unit 215 determines whether or not there is a possibility of the door 12 and the object colliding when the door 12 is opened. When there is a possibility of the door 12 and the object colliding, the collision determination unit 215 calculates the collision position between the door 12 and the object.

When the collision determination unit 215 calculates the collision position between the door 12 and the object, the door opening degree control unit 216 controls the door opening degree adjustment unit 13 to limit the opening degree of the door 12 so that the door 12 stops immediately before the collision position.

Figure 4:
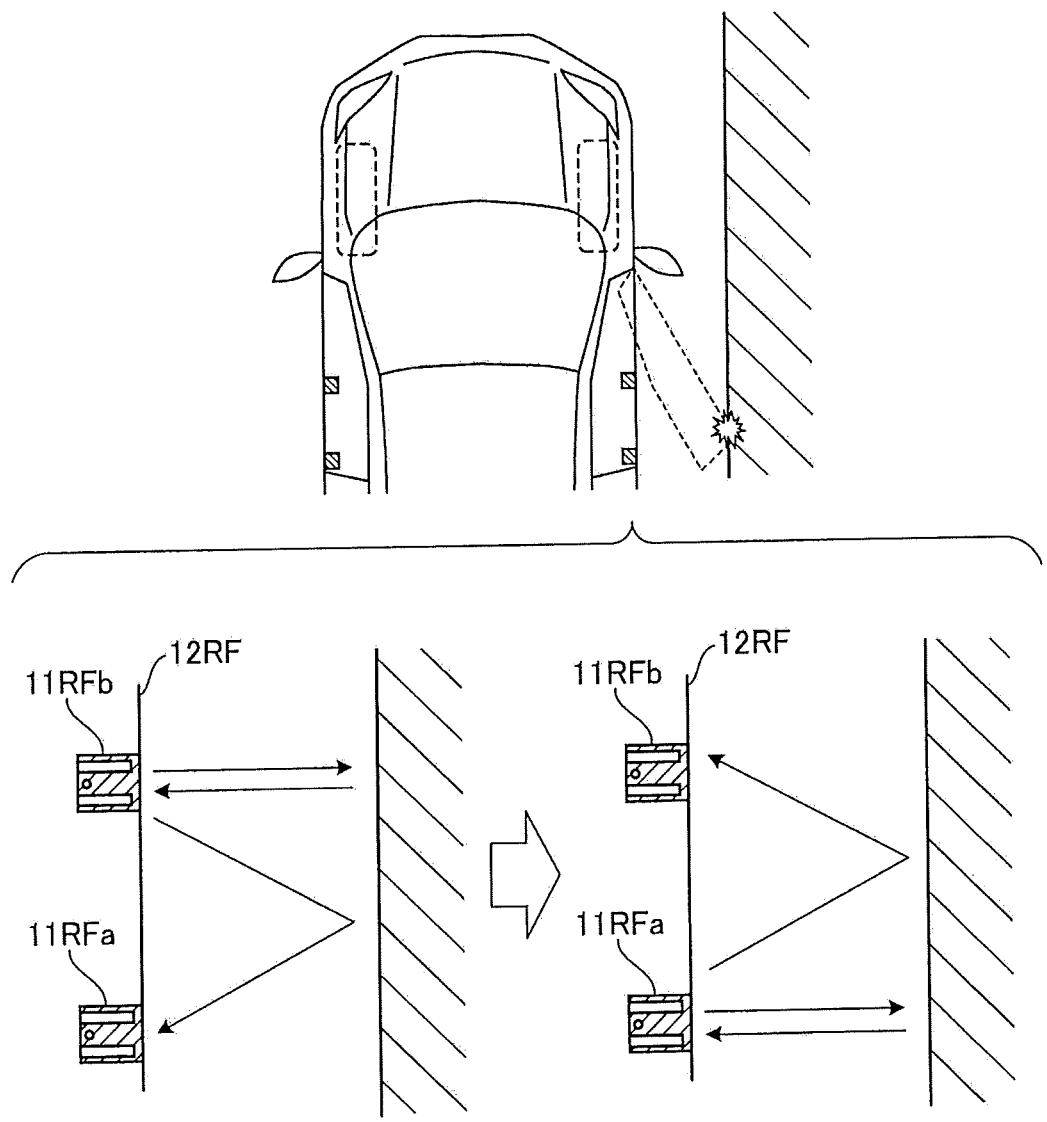
FIG. 4 is an explanatory diagram of an outline of functions of multiple transmission/reception units of the first embodiment.

Next, an object detection method by the object detection device 1 will be described with reference to FIGS. 4 to 14. FIG. 4 is an explanatory diagram of an outline of functions of the multiple transmission/reception units 11 of the first embodiment. As illustrated in FIG. 4, each of the multiple transmission/reception units 11 is configured to transmit the exploration wave radially toward the outside of the door 12 and receive the exploration wave directed thereto. At this time, among the multiple transmission/reception units 11, the transmission/reception units 11 provided on the same door 12 are configured to be paired and interworked. For example, two transmission/reception units 11RFa and 11RFb provided on the door 12RF illustrated in FIG. 4 operate in cooperation. Thus, an object in the vicinity of the door 12RF is detected to avoid collision with the object.

Specifically, each of the transmission/reception units 11RFa and 11RFb alternately repeats a period in which the exploration wave is transmitted and received and a period in which the exploration wave is received only. At this time, the transmission/reception unit 11RFa transmits and receives the exploration wave during a period in which the transmission/reception unit 11RFb receives the exploration wave. Further, the transmission/reception unit 11RFa only receives the exploration wave during a period in which the transmission/reception unit 11RFb transmits and receives the exploration wave. The transmission/reception unit 11RFb transmits and receives the exploration wave during a period in which the transmission/reception unit 11RFa receives the exploration wave. Further, the transmission/reception unit 11RFb only receives the exploration wave during a period in which the transmission/reception unit 11RFa transmits and receives the exploration wave. This state is illustrated in FIGS. 5A and 5B.

FIGS. 5A and 5B are schematic diagrams illustrating a state where multiple transmission/reception units 11RFa and 11RFb of the embodiment perform transmission/reception. In FIGS. 5A and 5B, it is assumed that an object 30w such as a wall exists parallel to the door 12RF in the vicinity of the door 12RF.

FIG. 5A illustrates a state where the transmission/reception unit 11RFa performs transmission and reception and the transmission/reception unit 11RFb performs reception only. In such a period, the transmission/reception units 11RFa and 11RFb receive various exploration wave reflected by the surrounding object 30 and the like. When the distance processing unit 211 of the processing unit 21 included in the object detection unit 20 receives information on these various exploration waves as transmission/reception information, the distance processing unit 211 determines that some object 30w exists in the vicinity of the door 12RF. Then, the distance processing unit 211 extracts the exploration wave received first by the transmission/reception units 11RFa and 11RFb from among various received exploration waves.

As illustrated in FIG. 5A, the transmission/reception unit 11RFa receives first an exploration wave T11 that has been transmitted toward the closest position of the wall-shaped object 30w from the transmission/reception unit 11RFa and has been reflected thereto. The distance processing unit 211 obtains a distance D11 between the transmission/reception unit 11RFa and the object 30w based on the detected exploration wave T11. The distance D11 is a value that is a half of a numerical value obtained by multiplying the speed of sound by the time from when the transmission/reception unit 11RFa transmits the exploration wave to when the transmission/reception unit 11RFa receives the exploration wave T11. However, the direction in which the object 30w exists may not be specified only with such information. Therefore, the object determination unit 212 calculates a virtual arc A11 that is spaced apart from the transmission/reception unit 11RFa by the distance D11 and assumes that the object 30w exists at least at any position on the arc A11.

Further, the transmission/reception unit 11RFb receives first an exploration wave T12 that has reached the transmission/reception unit 11RFb through the shortest path among paths from the transmission/reception unit 11RFa to the transmission/reception unit 11RFb via the object 30w. The distance processing unit 211 obtains the length of two sides of a triangle having the transmission/reception units 11RFa and 11RFb as two vertices and having the other vertex on the object 30w, i.e., the shortest distance D12=D13+D32 between the transmission/reception units 11RFa and 11RFb via the object 30w based on the detected exploration wave T12. The length of two sides D13+D32 is a value obtained by multiplying the speed of sound by the time from when the transmission/reception unit 11RFa transmits the exploration wave to when the transmission/reception unit 11RFb receives the exploration wave T12. Next, the distance processing unit 211 calculates the position of the other vertex of the triangle having the transmission/reception units 11RFa and 11RFb as two vertices. The position of the other vertex may be obtained by a trilateration method from the lengths D13 and D32 of two sides with the length of the side between the transmission/reception units 11RFa and 11RFb being known. However, since the individual lengths D13 and D32 of two sides are not known, it is not possible to specify the position of the other vertex as one only with such information. That is, there are multiple triangles having the obtained length of two sides D13-D32 and having the other vertices at different positions. Therefore, the object determination unit 212 calculates a virtual arc A12 that interconnects the other vertices P12 of these multiple triangles and assumes that the object 30w exists at least at any position on the arc A12.

Furthermore, the object determination unit 212 estimates that the object 30w exists at a point P1 (first point) that is the intersection of the two calculated arcs A11 and A12. However, the point P1 is slightly in front of (closer to the door 12RF than) the actual position of the object 30w.

FIG. 5B illustrates a state where the transmission/reception unit 11RFb performs transmission and reception and the transmission/reception unit 11RFa performs reception only. In such a period, the transmission/reception units 11RFa and 11RFb receive various exploration waves reflected by the surrounding object 30w and the like. The distance processing unit 211 receives information on these various exploration waves as transmission/reception information and extracts the exploration wave received first by the transmission/reception units 11RFa and 11RFb among the various exploration waves.

As illustrated in FIG. 5B, the transmission/reception unit 11RFa receives first an exploration wave T21 that has reached the transmission/reception unit 11RFa through the shortest path among paths from the transmission/reception unit 11RFb to the transmission/reception unit 11RFa via the object 30w. The distance processing unit 211 obtains the length of two sides D23+D31 of a triangle having the transmission/reception units 11RFa and 11RFb as two vertices and having the other vertex on the object 30w, i.e., the shortest distance D21=D23+D31 between the transmission/reception units 11RFa and 11RFb via the object 30w based on the detected exploration wave T21. The length of two sides D23+D31 is a value obtained by multiplying the speed of sound by the time from when the transmission/reception unit 11RFb transmits the exploration wave to when the transmission/reception unit 11RFa receives the exploration wave T21. Next, the distance processing unit 211 calculates the position of the other vertex of the triangle having the transmission/reception units 11RFa and 11RFb as two vertices. The position of the other vertex may be obtained by a trilateration method from the lengths D23 and D31 of two sides with a known length of the side between the transmission/reception units 11RFa and 11RFb. However, since the individual lengths D23 and D31 of two sides are not known, it is not possible to specify the position of the other vertex as one only with such information. That is, there are multiple triangles having the obtained length of two sides D23+D31 and having the other vertices at different positions. Therefore, the object determination unit 212 calculates a virtual arc A21 that interconnects the other vertices P21 of these multiple triangles and assumes that the object 30w exists at least at any position on the arc A21.

As illustrated in FIG. 5B, the transmission/reception unit 11RFb receives first an exploration wave T22 that has been transmitted toward the closest position of the wall-shaped object 30w from the transmission/reception unit 11RFb and has been reflected thereto. The distance processing unit 211 obtains a distance D22 between the transmission/reception unit 11RFb and the object 30w based on the detected exploration wave T22. The distance D22 is a value that is a half of a numerical value obtained by multiplying the speed of sound by the time from when the transmission/reception unit 11RFb transmits the exploration wave to when the transmission/reception unit 11RFb receives the exploration wave T22. However, the direction in which the object 30w exists may not be specified only with such information. Therefore, the object determination unit 212 calculates a virtual arc A22 that is spaced apart from the transmission/reception unit 11RFb by the distance D22 and assumes that the object 30w exists at least at any position on the arc A22.

Furthermore, the object determination unit 212 estimates that the object 30w exists at a point P2 (second point) that is the intersection of the two calculated arcs A21 and A22. However, the point P2 is slightly in front of (closer to the door 12RF than) the actual position of the object 30w.

As described above, the two points P1 and P2 are obtained as the positions where the object 30w exists. When the distance between these points P1 and P2 is equal to or greater than a predetermined value, i.e., when the points P1 and P2 are sufficiently separated from each other, it can be seen that the object 30w is an object such as a wall that is spread over as a wide range to some extent. This state is illustrated in FIG. 6.

Figure 6:
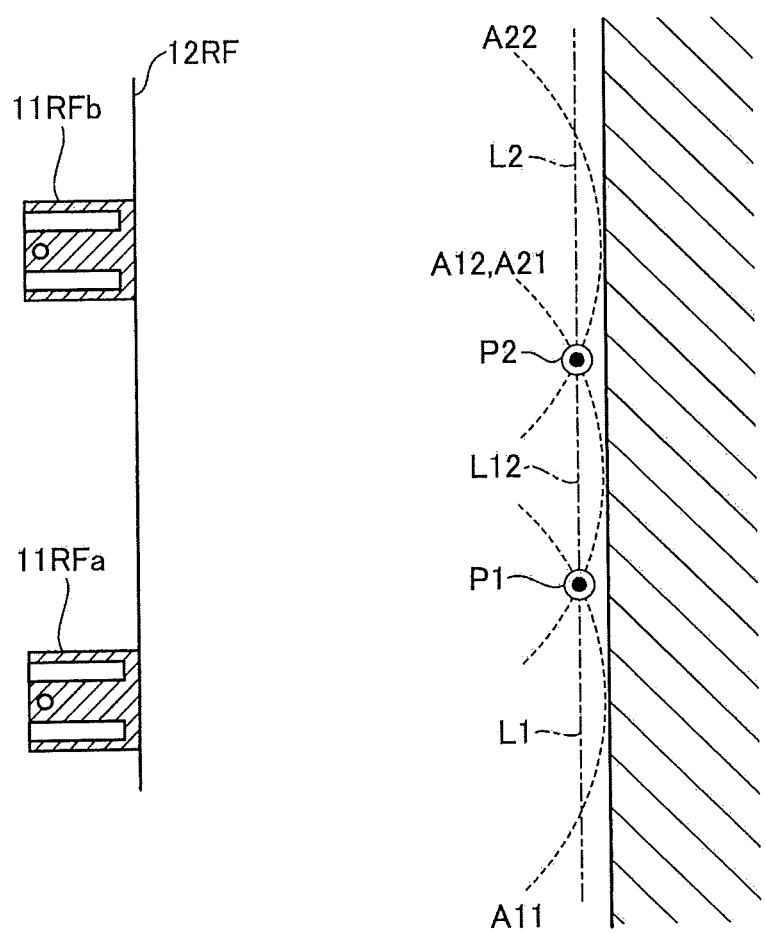
FIG. 6 is a schematic diagram illustrating a state where an object is determined by an object detection unit of the first embodiment.
Figure 7:
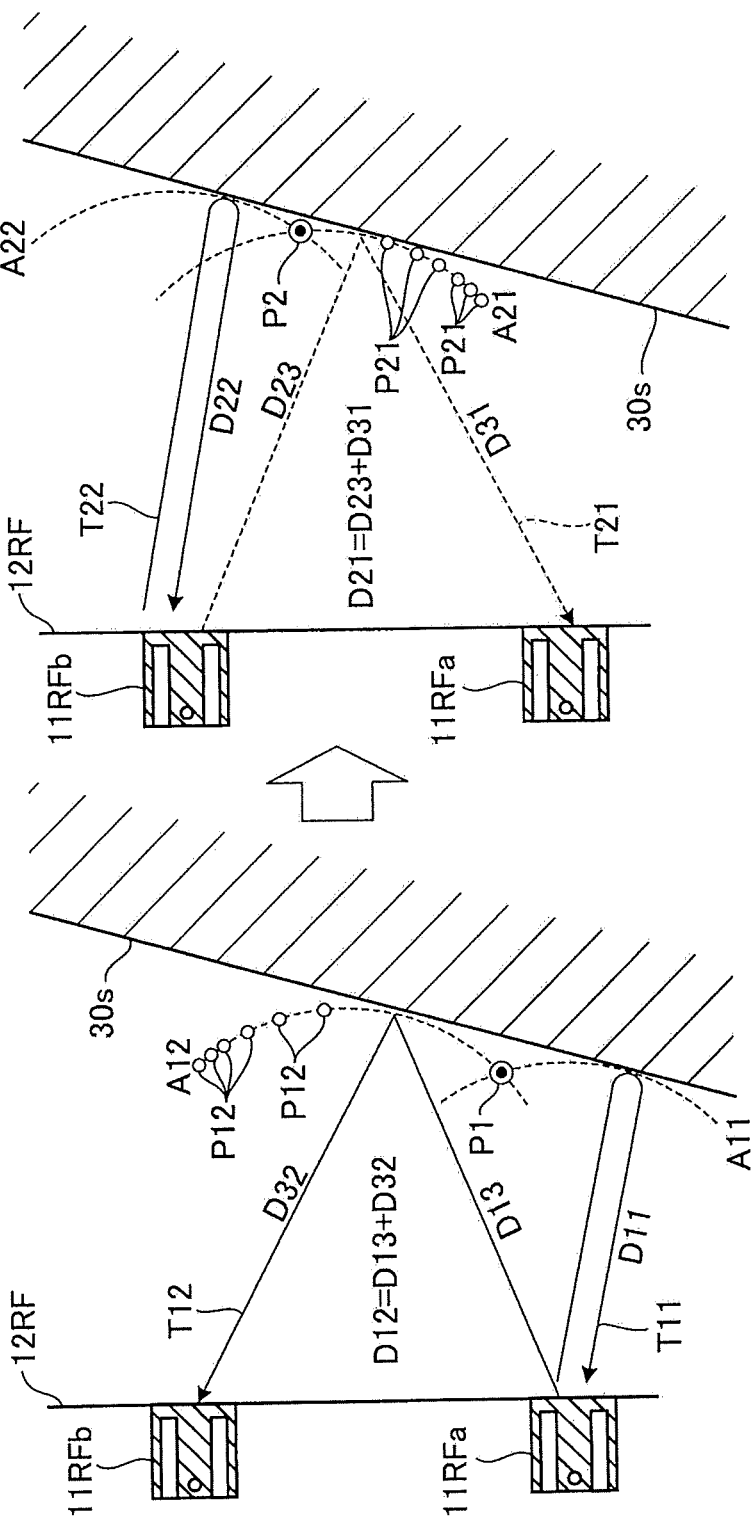
FIGS. 7A and 7B are schematic diagrams illustrating a state where multiple transmission/reception units of the first embodiment perform transmission and reception.

FIG. 6 is a schematic diagram illustrating a state where the object 30w is determined by the object detection unit 20 of the embodiment. As illustrated in FIG. 6, the distance processing unit 211 determines whether or not the distance between the points P1 and P2 is equal to or greater than a predetermined value (a predetermined separation distance threshold) based on the obtained points P1 and P2. The predetermined value is, for example, a threshold stored in numerical data of the storage unit 22. When the distance between the points P1 and P2 is equal to or greater than the predetermined value, the object determination unit 212 determines that the object 30w having a certain extent exists, parallel to the door 12RF, on a line segment L12 interconnecting the points P1 and P2 and line segments L1 and L2 obtained by extending both ends of the line segment L12.

Next, a case where a wall-shaped object exists obliquely with respect to the door 12RF will be described.

FIGS. 7A and 7B are schematic diagrams illustrating a state where multiple transmission/reception units 11RFa and 11RFb of the embodiment perform transmission and reception. In FIGS. 7A and 7B, it is assumed that an object 30s such as a wall exists obliquely with respect to the door 12RF in the vicinity of the door 12RF.

FIG. 7A illustrates a state where the transmission/reception unit 11RFa performs transmission and reception and the transmission/reception unit 11RFb performs reception only. The distance processing unit 211 extracts the exploration wave received first by the transmission/reception units 11RFa and 11RFb.

As illustrated in FIG. 7A, the transmission/reception unit 11RFa receives first an exploration wave T11 that has passed through the shortest path between the transmission/reception unit 11RFa and the object 30s. The distance processing unit 211 obtains a distance D11 between the transmission/reception unit 11RFa and the object 30s based on the detected exploration wave T11. Then, the object determination unit 212 calculates a virtual arc A11 spaced apart from the transmission/reception unit 11RFa by the distance D11.

Further, the transmission/reception unit 11RFb receives first an exploration wave T12 that has passed through the shortest path from the transmission/reception unit 11RFa to the transmission/reception unit 11RFb via the object 30s. The distance processing unit 211 obtains the length of two sides D12=D13+D32 of a triangle having the transmission/reception units 11RFa and 11RFb as two vertices and the other vertex on the object 30s based on the detected exploration wave T12. Then, the object determination unit 212 obtains the other vertices of multiple triangles by a trilateration method and calculates a virtual arc A12 interconnecting such multiple vertices P12.

Furthermore, the object determination unit 212 estimates that the object 30s exists at a point P1 that is the intersection of the two calculated arcs A11 and A12. However, the point P1 is slightly in front of (closer to the door 12RF than) the actual position of the object 30s.

FIG. 7B illustrates a state where the transmission/reception unit 11RFb performs transmission and reception and the transmission/reception unit 11RFa performs reception only. The distance processing unit 211 extracts the exploration wave received first by the transmission/reception units 11RFa and 11RFb.

As illustrated in FIG. 7B, the transmission/reception unit 11RFa receives first an exploration wave T21 that has passed through the shortest path from the transmission/reception unit 11RFb to the transmission/reception unit 11RFa via the object 30s. The distance processing unit 211 obtains the length of two sides D21=D23+D31 of a triangle having the transmission/reception units 11RFa and 11RFb as two vertices and the other vertex on the object 30s based on the detected exploration wave T21. Then, the object determination unit 212 obtains the other vertices of multiple triangles by a trilateration method and calculates a virtual arc A21 that interconnects such multiple vertices P21.

Further, the transmission/reception unit 11RFb receives first an exploration wave T22 that has passed through the shortest path between the transmission/reception unit 11RFb and the object 30s. The distance processing unit 211 obtains a distance D22 between the transmission/reception unit 11RFb and the object 30s based on the detected exploration wave T22. Then, the object determination unit 212 calculates a virtual arc A22 that is spaced apart from the transmission/reception unit 11RFb by the distance D22.

Furthermore, the object determination unit 212 estimates that the object 30s exists at a point P2 that is the intersection of the two calculated arcs A21 and A22. However, the point P2 is slightly in front of (closer to the door 12RF than) the actual position of the object 30s.

Figure 8:
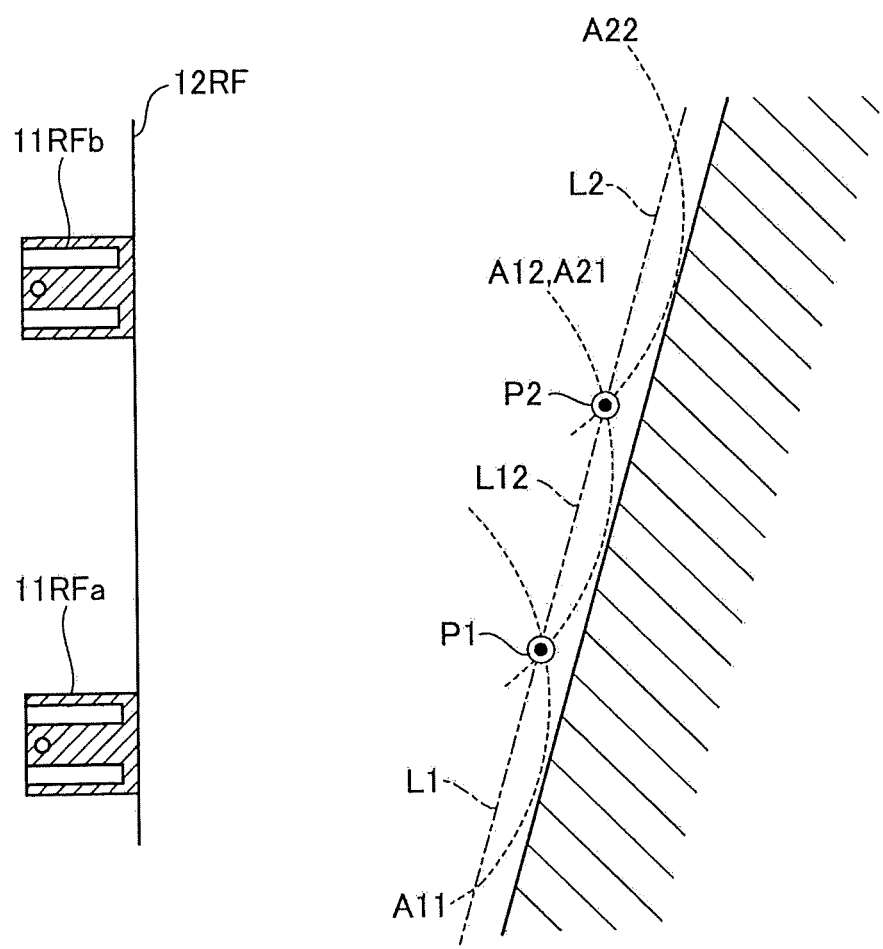
FIG. 8 is a schematic diagram illustrating a state where an object is determined by the object detection unit of the first embodiment.

FIG. 8 is a schematic diagram illustrating a state where the object 30s is determined by the object detection unit 20 of the embodiment. The object determination unit 212 of the object detection unit 20 determines that the object 30s is an object such as a wall that is spread over a wide range to some extent when the separation distance between the obtained points P1 and P2 is equal to or greater than a predetermined value. That is, as illustrated in FIG. 8, the object determination unit 212 determines that the object 30s having a certain extent exists, obliquely with respect to the door 12RF, on the line segment L12 interconnecting the points P1 and P2 and the line segments L1 and L2 obtained by extending both ends of the line segment L12.

Next, a case where a pole-shaped object exists in the vicinity of the door 12RF will be described.

FIGS. 9A and 9B are schematic diagrams illustrating a state where multiple transmission/reception units 11RFa and 11RFb of the embodiment perform transmission and reception. In FIGS. 9A and 9B, it is assumed that a rod-shaped object 30p such as a pole exists in the vicinity of the door 12RF.

FIG. 9A illustrates a state where the transmission/reception unit 11RFa performs transmission and reception and the transmission/reception unit 11RFb performs reception only. The distance processing unit 211 extracts exploration waves T11 and T12 received first by the transmission/reception units 11RFa and 11RFb.

As illustrated in FIG. 9A, the distance processing unit 211 obtains a distance D11 between the transmission/reception unit 11RFa and the object 30p based on the detected exploration wave T11. Then, the object determination unit 212 calculates a virtual arc A11 that is spaced apart from the transmission/reception unit 11RFa by the distance D11.

Further, the distance processing unit 211 obtains the length of two sides D12=D13+D32 of a triangle having the transmission/reception units 11RFa and 11RFb as two vertices and having the other vertex on the object 30p based on the detected exploration wave T12. Then, the object determination unit 212 calculates a virtual arc A12 that interconnects the other vertices P12 of these multiple triangles.

Furthermore, the object determination unit 212 estimates that the object 30p exists at a point P1 that is the intersection of the two calculated arcs A11 and A12. However, the point P1 is slightly in front of (closer to the door 12RF than) the actual position of the object 30p.

FIG. 9B illustrates a state where the transmission/reception unit 11RFb performs transmission and reception and the transmission/reception unit 11RFa performs reception only. The distance processing unit 211 extracts exploration waves T21 and T22 received first by the transmission/reception units 11RFa and 11RFb.

As illustrated in FIG. 9B, the distance processing unit 211 obtains the length of two sides D21=D23+D31 of a triangle having the transmission/reception units 11RFa and 11RFb as two vertices and having the other vertex on the object 30p based on the detected exploration wave T21. Then, the object determination unit 212 calculates a virtual arc A21 that interconnects the other vertices P21 of these multiple triangles.

Further, the distance processing unit 211 obtains a distance D22 between the transmission/reception unit 11RFb and the object 30p based on the detected exploration wave T22. Then, the object determination unit 212 calculates a virtual arc A22 that is spaced apart from the transmission/reception unit 11RFb by the distance D22.

Furthermore, the object determination unit 212 estimates that the object 30p exists at a point P2 that is the intersection of the two calculated arcs A21 and A22. However, the point P2 is slightly in front of (closer to the door 12RF than) the actual position of the object 30p.

Figure 10:
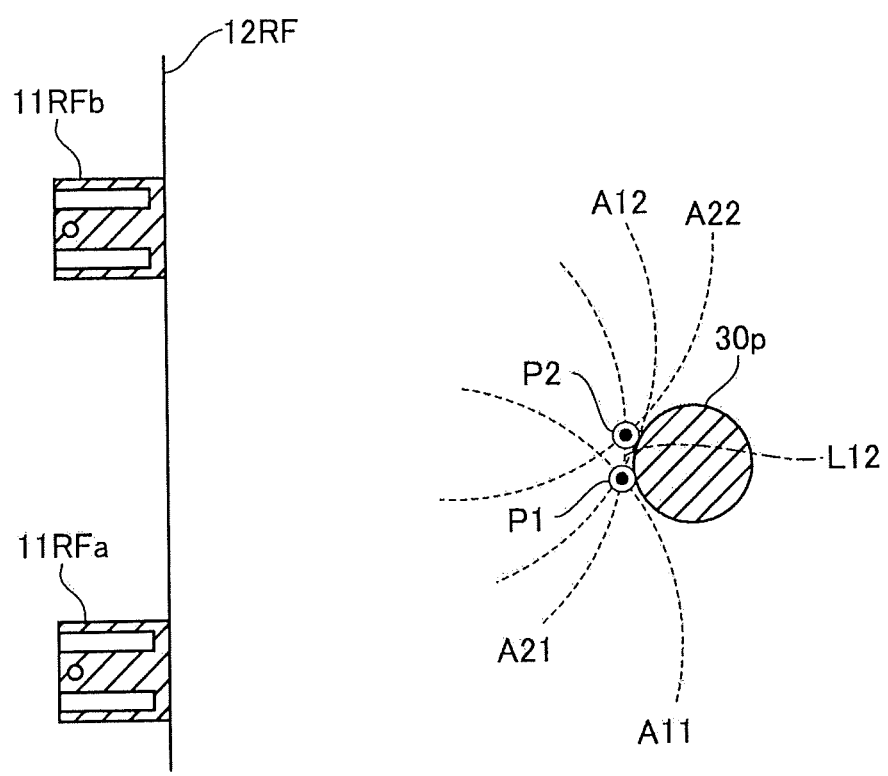
FIG. 10 is a schematic diagram illustrating a state where an object is determined by the object detection unit of the first embodiment.

FIG. 10 is a schematic diagram illustrating a state where the object 30p is determined by the object detection unit 20 of the embodiment. As illustrated in FIG. 10, the separation distance between the obtained points P1 and P2 is less than a predetermined value. That is, the points P1 and P2 are very close to each other. From this, the object determination unit 212 determines that the object 30p is a rod-shaped object limited to a somewhat narrow range. Specifically, the object determination unit 212 of the object detection unit 20 determines, based on the obtained points P1 and P2, that the object 30p exists in a limited range on the line segment L12 interconnecting the points P1 and P2.

As described above with reference to FIGS. 5A to 10, the object determination unit 212 of the object detection unit 20 determines the distance and direction from the door 12RF and the external shape such as a wall shape or a pole shape of the object detected by the transmission/reception units 11RFa and 11RFb. This is the same even when the other transmission/reception units 11RBa, 11RBb, 11LFa, 11LFb, 11LBa and 11LBb are used. The transmission/reception units 11RBa and 11RBb provided on the door 12RB operate in cooperation to detect an object in the vicinity of the door 12RB. The transmission/reception units 11LFa and 11LFb provided on the door 12LF operate in cooperation to detect an object in the vicinity of the door 12LF. The transmission/reception units 11LBa and 11LBb provided on the door 12LB operate in cooperation to detect an object in the vicinity of the door 12LB. The object determination unit 212 determines the position and external shape of the object detected by the respective transmission/reception units 11.

In addition, when a target object is located so as to include the center line of the exploration wave (the portion where the intensity of the exploration wave is highest) (e.g., in the case of a wall located so as to include the center line of the exploration wave), highly accurate object position calculation may be performed with the above-described processing alone. However, when the target object is located so as to be shifted from the center line of the exploration wave (e.g., in the case of a guardrail located so as to be shifted from the center line of the exploration wave), highly accurate object position calculation may be performed by performing the following processing.

Figure 11A:
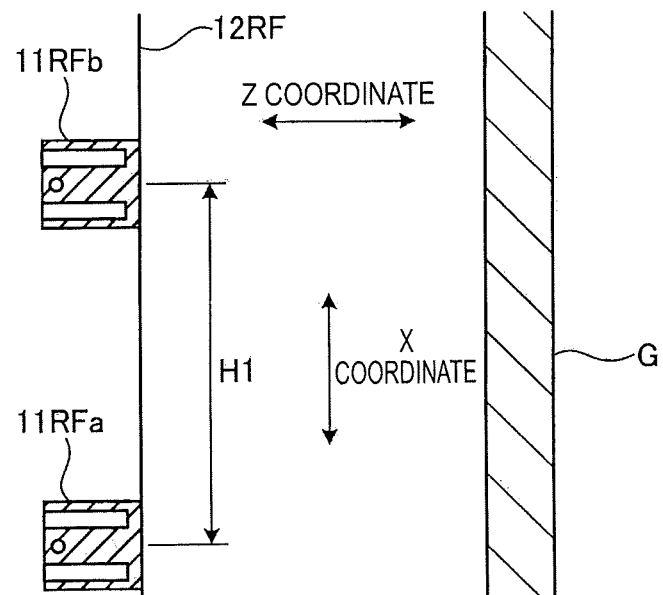
FIGS. 11A and 11B are schematic diagrams illustrating a positional relationship between multiple transmission/reception units and a guardrail in the first embodiment.
Figure 11B:
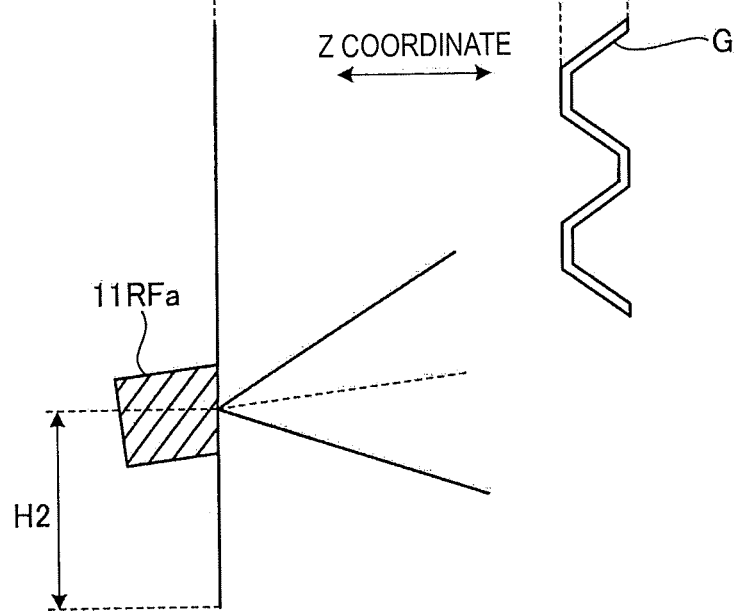

FIGS. 11A and 11B are schematic diagrams illustrating a positional relationship between multiple transmission/reception units 11 and a guardrail G in the first embodiment. Specifically, FIG. 11A is a plan view of the transmission/reception units 11RFa and 11RFb, the guardrail G, and the like as viewed from above. Further, FIG. 11B is a diagram of the transmission/reception units 11RFa and 11RFb, the guardrail G, and the like as viewed from the lateral side.

As illustrated in FIG. 11B, the transmission/reception units 11RFa and 11RFb are provided slightly upward from the horizontal direction. This is to make it difficult to detect an object further below the lowermost portion of the door 12RF (i.e., an object that does not collide even when the door 12RF is opened).

Further, the vertical width of an ultrasonic wave transmitted by the transmission/reception units 11RFa and 11RFb is reduced within a predetermined range. Further, the guardrail G is located so as to be shifted from the center line of the ultrasonic wave transmitted by the transmission/reception units 11RFa and 11RFb. Thus, when the object is such a guardrail G, the separation distance between the point P1 (first point) and the point P2 (second point) calculated by the distance processing unit 211 is equal to or greater than a predetermined separation distance threshold and the reflection intensity is less than a predetermined reflection intensity threshold. In such a case, since there is a high possibility of the object position being calculated farther than it actually is, the object position is corrected so that the distance to the object is reduced. These will be described below in detail.

Figure 12:
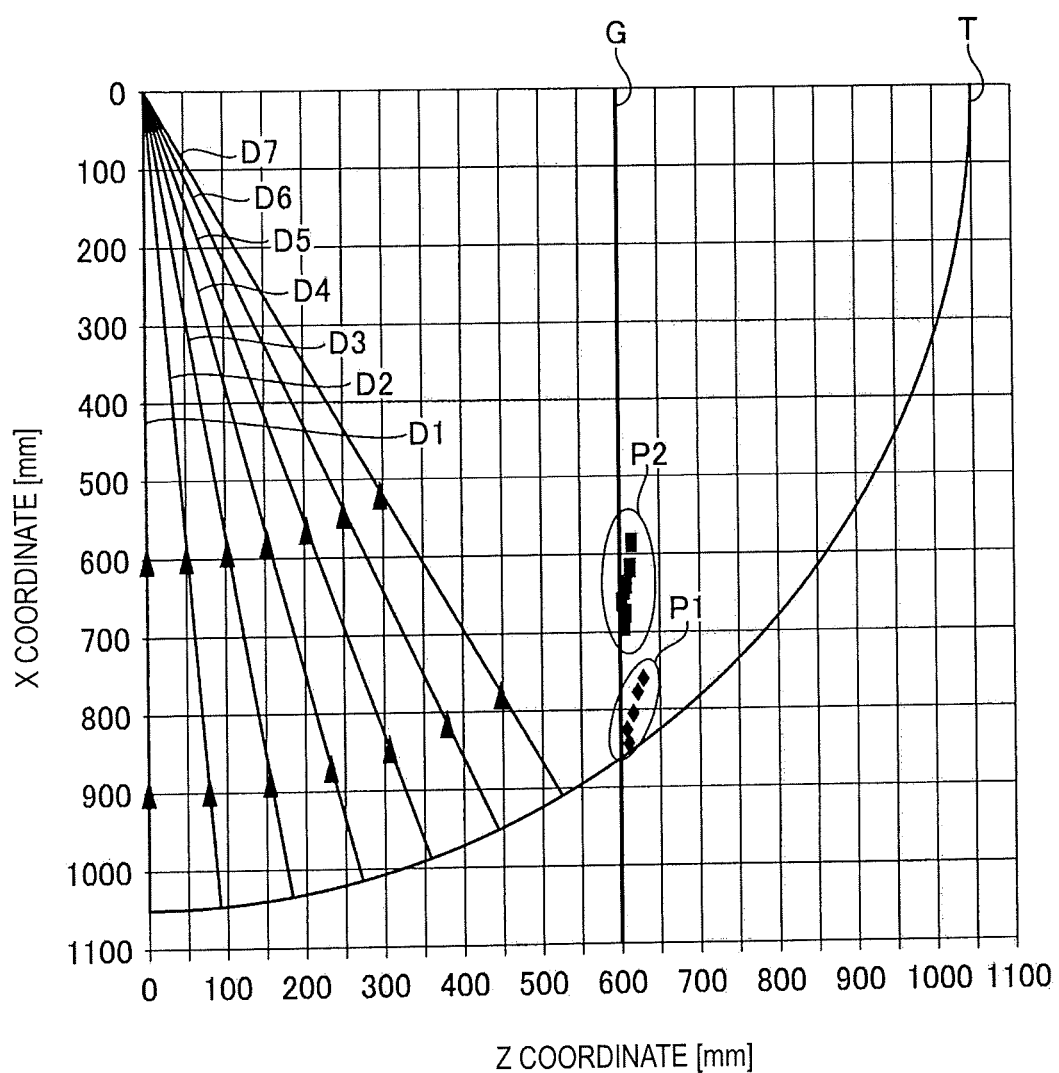
FIG. 12 is a graph illustrating the detection position of the guardrail when a door is opened in the direction of approaching a guardrail in the case of FIGS. 7A and 7B.

FIG. 12 is a graph illustrating the detection position of the guardrail G when the door 12RF is opened in the direction of approaching the guardrail G in the case of FIGS. 11A and 11B. The reference symbol T indicates the locus of the end of the door 12RF. In FIG. 12, the directions of the X coordinate on the vertical axis and the Z coordinate on the horizontal axis are as illustrated in FIGS. 11A and 11B.

Then, when the door 12RF is opened in the directions indicated by reference symbols D1 to D7, the points P1 and P2 calculated by the distance processing unit 211 are points farther from the actual position of the guardrail G.

Figure 13:
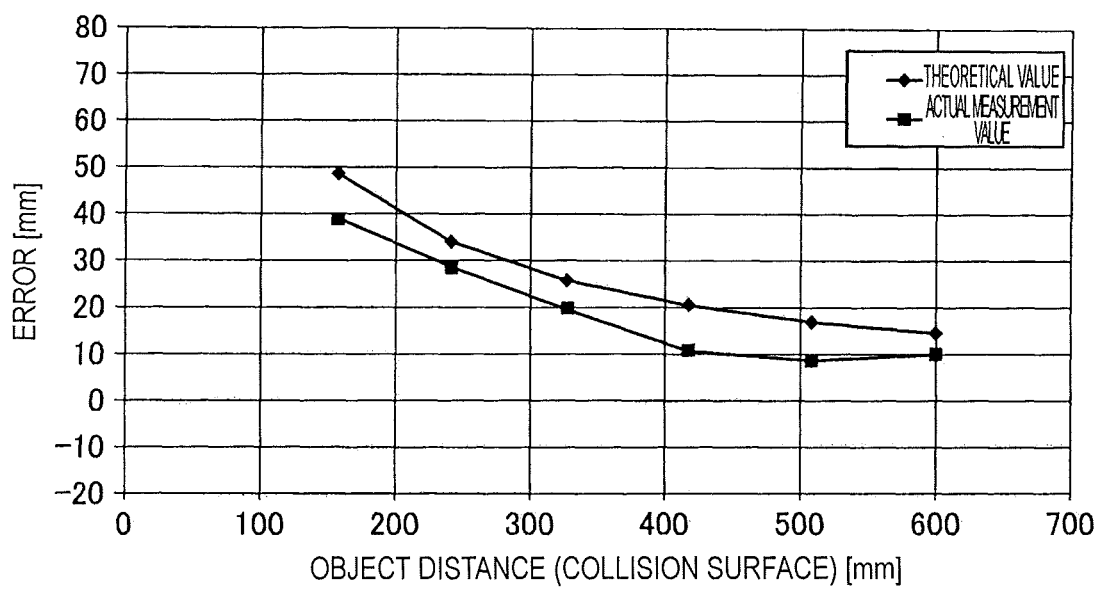
FIG. 13 is a graph illustrating a relationship between the object distance and the error in the case of FIG. 12.

FIG. 13 is a graph illustrating a relationship between the object distance (distance to the guardrail G) and the error (distance error) in the case of FIG. 12. As illustrated in FIG. 13, it can be seen that the error increases as the object distance decreases with respect to both the theoretical value and the actual measurement value.

Figure 14:
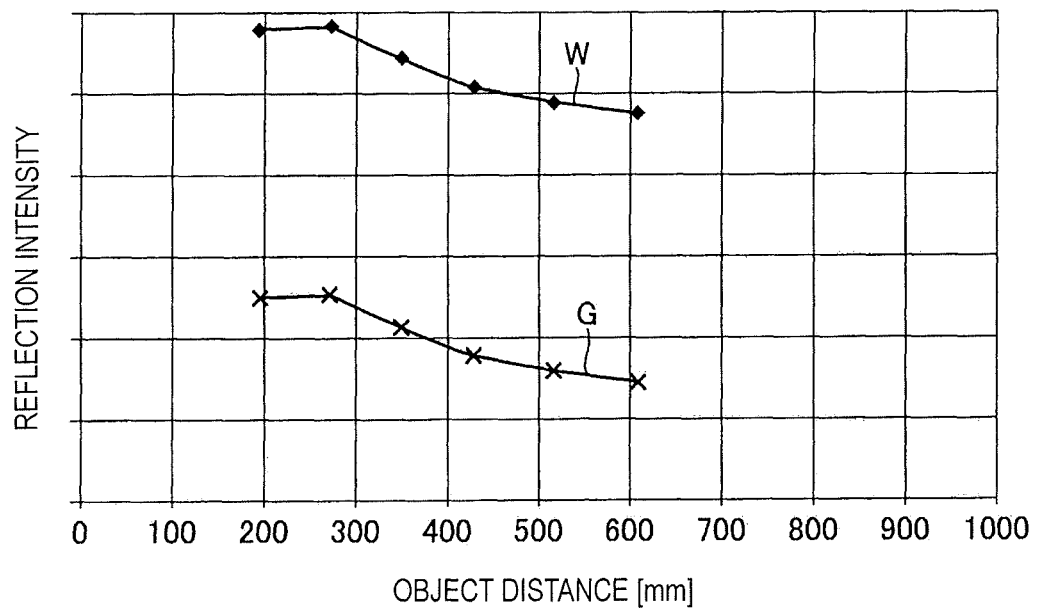
FIG. 14 is a graph illustrating a relationship between the object distance and the reflection intensity when an object is a wall and when an object is a guardrail in the first embodiment.

FIG. 14 is a graph illustrating a relationship between the object distance (distance to an object) and the reflection intensity when the object is a wall and when the object is a guardrail in the first embodiment. As illustrated in FIG. 14, it can be seen that the reflection intensity when the object is the guardrail G is significantly smaller than the reflection intensity when the object is the wall.

Thus, the position correction unit 214 corrects the position of the object so that the distance to the object is reduced when the separation distance between the points P1 and P2 is equal to or greater than a predetermined value and when the reflection intensity is less than a predetermined reflection intensity threshold.

Next, a method of avoiding collision between an object and the door 12 by the object detection device 1 will be described with reference to FIGS. 15A to 17B. In the following description, an example of performing collision avoidance on an object that is mainly determined based on an operation of the transmission/reception units 11RFa and 11RFb will be described, but collision avoidance may be performed by the same method even when the other transmission/reception units 11RBa, 11RBb, 11LFa, 11LFb, 11LBa and 11LBb are used.

As described above, when it is determined that an object that may be an obstacle exists in the vicinity of the door 12RF, the object detection device 1 performs collision avoidance according to the external shape of the object.

Figure 15A:
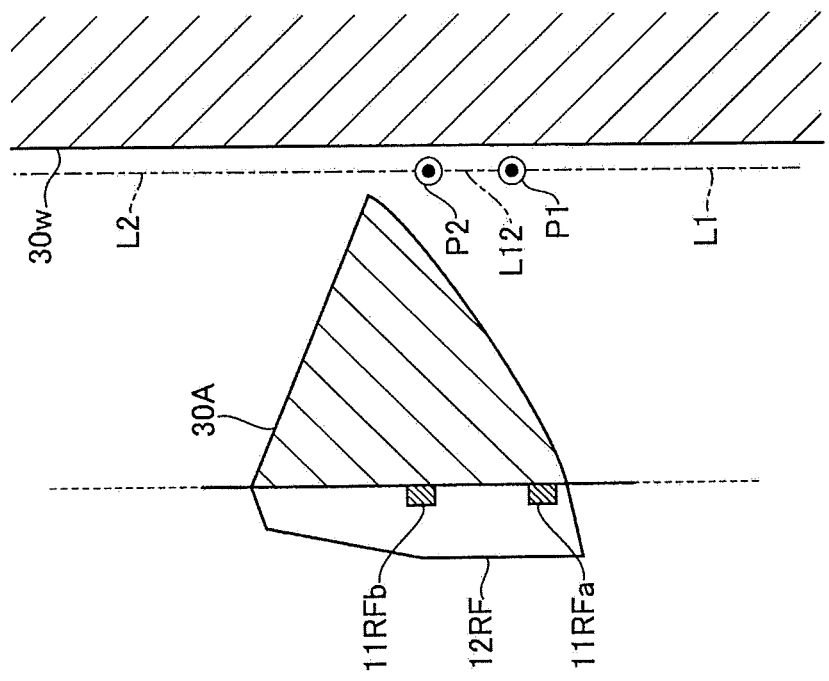
FIGS. 15A and 15B are schematic diagrams illustrating a state where the collision position between an object and a door is determined by the object detection unit of the first embodiment.
Figure 15B:
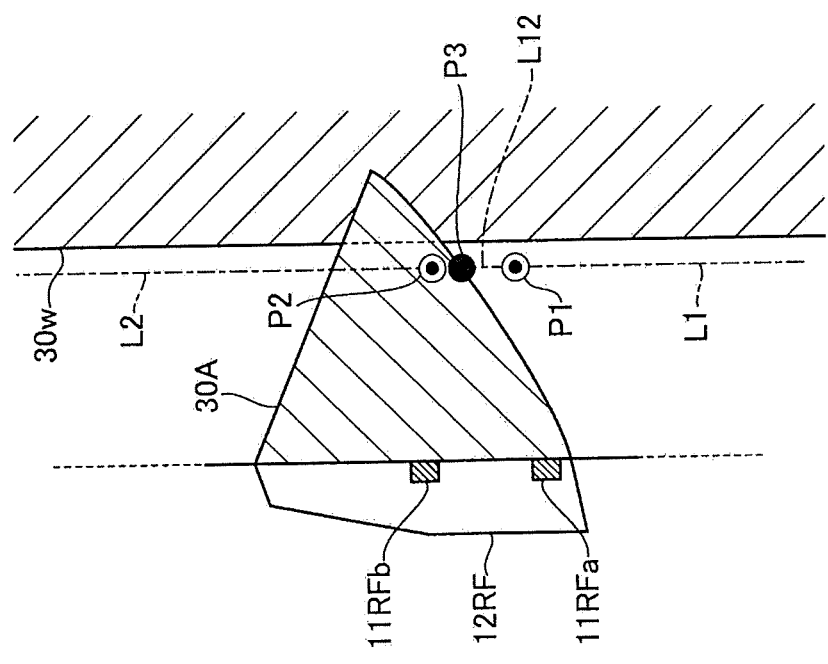

FIGS. 15A and 15B are schematic diagrams illustrating a state where the collision position between the object 30w and the door 12RF is determined by the object detection unit 20 of the embodiment. In FIGS. 15A and 15B, it is assumed that the object 30w such as a wall exists parallel to the door 12RF in the vicinity of the door 12RF.

As illustrated in FIGS. 15A and 15B, the collision determination unit 215 determines whether or not there is a possibility of the door 12RF and the object colliding when the door 12RF is opened. When there is a possibility of the door 12RF and the object colliding, the collision determination unit 215 calculates the collision position between the door 12RF and the object.

Specifically, the collision determination unit 215 determines whether or not the detected object 30w exists within an area 30A surrounded by the fully closed position of the door 12RF, the fully opened position of the door 12RF, and the locus of the door 12RF at the opening/closing time of the door 12RF with reference to the door locus data stored in the storage unit 22. When it is determined that the object 30w is a wall-shaped object, the object 30w is determined as existing not only on the line segment L12 between the points P1 and P2 but also on the line segments L1 and L2 obtained by extending both ends of the line segment L12. Thus, the collision determination unit 215 determines whether or not any of the line segments L1, L12 and L2 indicating the presence of the object 30w is included in the area 30A.

In FIG. 15A, the line segments L12 and L2 among the line segments L1, L12 and L2 are included in the area 30A. In addition, when the door 12RF is opened from the fully closed state, the door 12RF first collides with a point P3 on the line segment L12. The collision determination unit 215 calculates the point P3 as the collision position. When the collision determination unit 215 calculates the collision position between the door 12RF and the object 30w, the door opening degree control unit 216 controls the door opening degree adjustment unit 13 to limit the opening degree of the door 12RF so that the door 12RF is stopped before the collision position. Since the line segments L1, L12 and L2 are determined as being slightly closer to the door 12RF than the actual position of the object 30w, in consideration of this, the position where collision may be sufficiently avoided is set to the limit position of the opening degree of the door 12RF.

In FIG. 15B, none of the line segments L1, L12 and L2 is included in the area 30A. Thus, the collision determination unit 215 does not calculate the collision position, and the door opening degree control unit 216 does not limit the opening degree of the door 12RF. That is, the door 12RF may be fully opened.

FIGS. 16A and 16B are schematic diagrams illustrating a state where the collision position between the object 30s and the door 12RF is determined by the object detection unit 20 of the embodiment. In FIGS. 16A and 16B, it is assumed that the object 30s such as a wall is determined as existing obliquely with respect to the door 12RF in the vicinity of the door 12RF.

In FIG. 16A, all of the line segments L1, L12 and L2 are included in the area 30A. In addition, when the door 12RF is opened from the fully closed state, the door 12RF first collides with a point P3 on the line segment L1. The collision determination unit 215 calculates the point P3 as the collision position. The door opening degree control unit 216 controls the door opening degree adjustment unit 13 to limit the opening degree of the door 12RF so that the door 12RF is stopped before the collision position.

In FIG. 16B, none of the line segments L1, L12 and L2 is included in the area 30A. Thus, the collision determination unit 215 does not calculate the collision position, and the door opening degree control unit 216 does not limit the opening degree of the door 12RF.

Figure 17A:
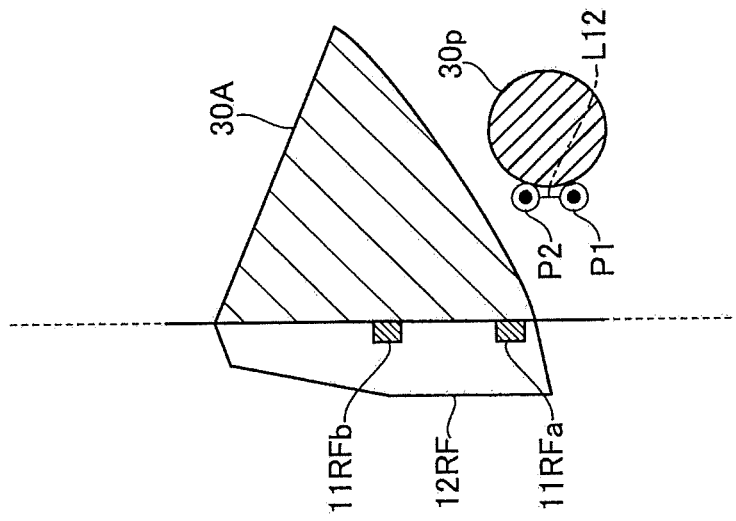
FIGS. 17A and 17B are schematic diagrams illustrating a state where the collision position between an object and a door is determined by the object detection unit of the first embodiment.
Figure 17B:
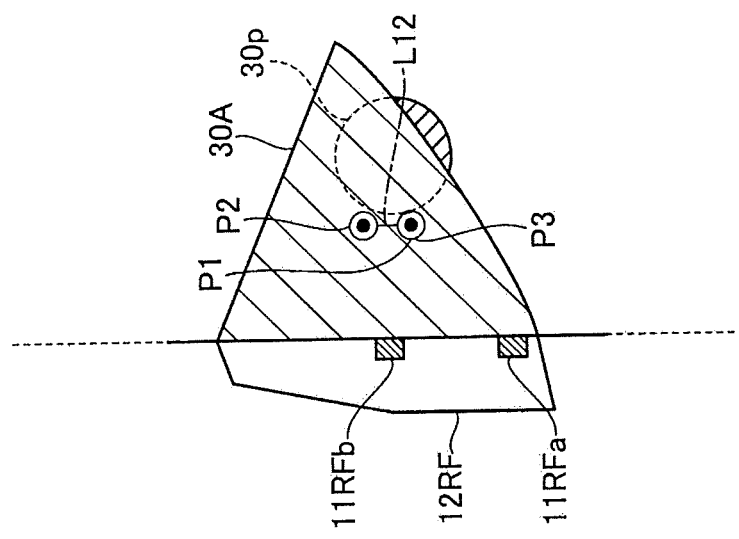

FIGS. 17A and 17B are schematic diagrams illustrating a state where the collision position between the object 30p and the door 12RF is determined by the object detection unit 20 of the embodiment. In FIGS. 17A and 17B, it is assumed that the rod-shaped object 30p such as a pole is determined as existing in the vicinity of the door 12RF. When the object 30p is a pole-shaped object, it is determined that the object 30p exists only on the line segment L12 without considering the extension line of the line segment L12.

In FIG. 17A, the line segment L12 is included in the area 30A. In addition, when the door 12RF is opened from the fully closed state, the door 12RF first collides with a point P3 that overlaps with a point P1 on the line segment L12. The collision determination unit 215 calculates the point P3 as the collision position. The door opening degree control unit 216 controls the door opening degree adjustment unit 13 to limit the opening degree of the door 12RF so that the door 12RF is stopped before the collision position.

In FIG. 17B, the line segment L12 is not included in the area 30A. Thus, the collision determination unit 215 does not calculate the collision position, and the door opening degree control unit 216 does not limit the opening degree of the door 12RF.

Figure 18:
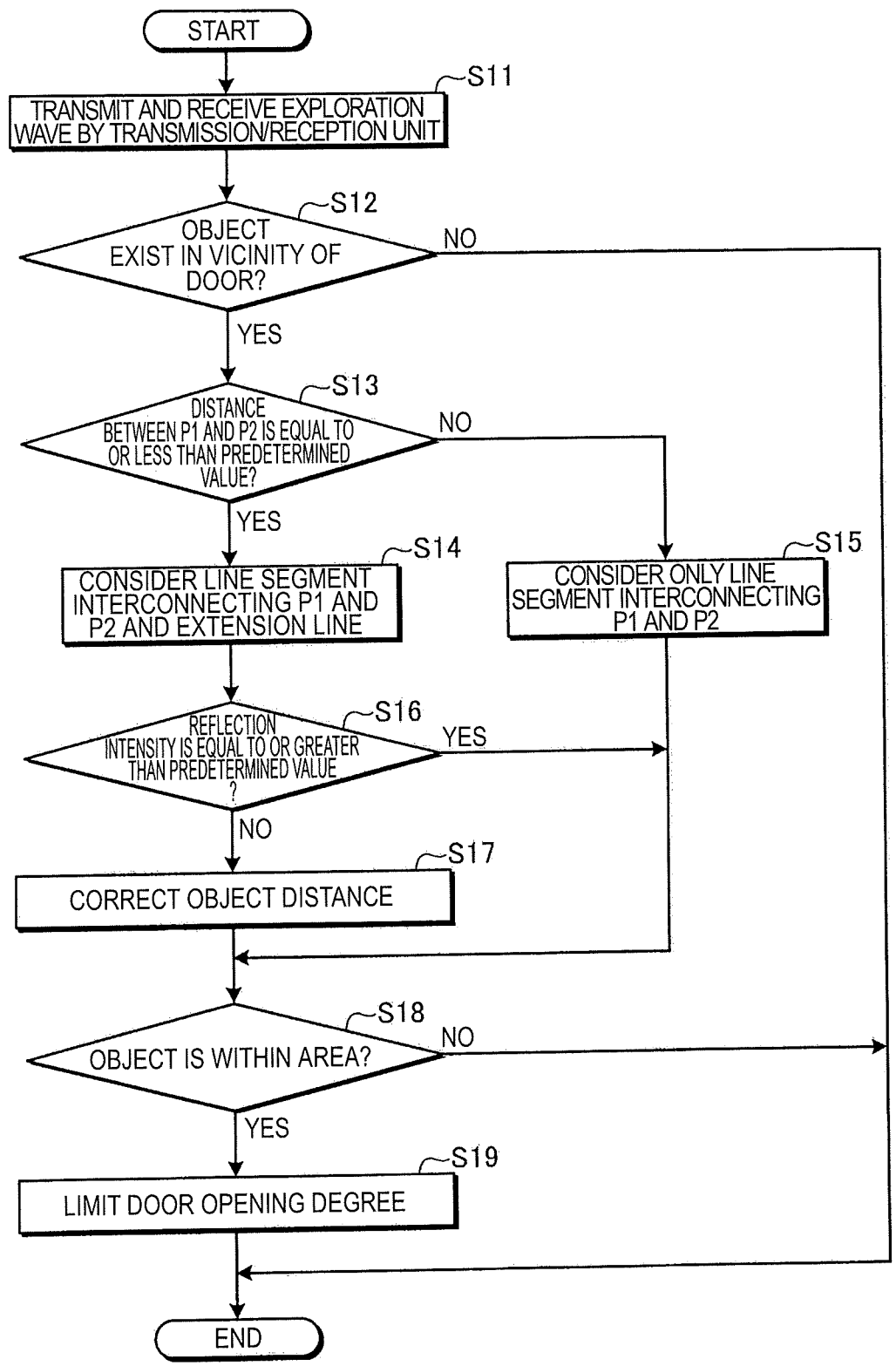
FIG. 18 is a flowchart illustrating the procedure of an object detection processing by the object detection device according to the first embodiment.

Next, the procedure of an object detection processing by the object detection device 1 will be described. FIG. 18 is a flowchart illustrating the procedure of an object detection processing by the object detection device 1 of the first embodiment. As illustrated in FIG. 18, in step S11, among the transmission/reception units 11 of the object detection device 1, each of the transmission/reception units 11 provided on the same door 12 alternately repeats a period in which the exploration wave is transmitted and received and a period in which the exploration wave is received only.

In step S12, the object determination unit 212 of the object detection device 1 determines whether or not an object exists in the vicinity of the door 12 from the obtained exploration wave information. When no object exists in the vicinity of the door 12 (step S12: No), the object detection device 1 terminates the object detection processing. When an object exists in the vicinity of the door 12 (step S12: Yes), in step S13, the object determination unit 212 determines whether or not the separation distance between the point P1 that is the intersection of the calculated arcs A11 and A12 and the point P2 that is the intersection of the arcs A21 and A22 is equal to or greater than a predetermined value.

When the separation distance between the points P1 and P2 is equal to or greater than the predetermined value (step S13: Yes), in step S14, the object determination unit 212 specifies the position and external shape of the object in consideration of the line segment L12 interconnecting the points P1 and P2 and the line segments L1 and L2 obtained by extending both the ends of the line segment L12.

When the separation distance between the points P1 and P2 is less than the predetermined value (step S13: No), in step S15, the object determination unit 212 specifies the position and external shape of the object in consideration of only the line segment L12 interconnecting the points P1 and P2.

In step S16, the reflection intensity processing unit 213 determines whether or not the reflection intensity is equal to or greater than a predetermined value (predetermined reflection intensity threshold). The processing proceeds to step S18 in the case of "Yes" and proceeds to step S17 in the case of "No."

In step S17, the position correction unit 214 corrects the object distance. That is, the position of the object is corrected so that the distance to the object is reduced.

In step S18, the collision determination unit 215 determines whether or not the object exists in the area 30A based on the locus of the door 12 from the position and external shape of the object determined by the object determination unit 212. When the object does not exist in the area 30A (step S18: No), the object detection device 1 terminates the object detection processing. When the object exists in the area 30A (step S18: Yes), in step S19, the door opening degree control unit 216 controls the door opening degree adjustment unit 13 to limit the opening degree of the door 12. By the above, the object detection processing by the object detection device 1 is terminated.

In this way, according to the object detection device 1 of the first embodiment, the accuracy of object position calculation may be improved. Specifically, the calculated object position may be appropriately corrected based on the separation distance between the first point and the second point and the reflection intensity of the exploration wave.

For example, even when a target object is horizontally long and is located so as to be shifted from the center line of the exploration wave (e.g., in the case of a guardrail), the object position may be calculated with high accuracy. Specifically, when the separation distance between the first point and the second point is large and when the reflection intensity is low, the object position may be corrected appropriately since there is a high possibility of the object position being calculated farther than it actually is. In other words, since it is possible to determine whether or not the object is located so as to be shifted from the center line of the exploration wave after distinguishing whether the object is a horizontally long object such as a wall or guardrail or a horizontally short object such as a pole, it is possible to prevent the distance from being erroneously corrected in the case of an object such as a pole that has a low reflection intensity and does not need distance correction.

Further, since the position of the object may be calculated (and corrected) with high accuracy, whether or not the door 12 collides with the object when the door 12 is opened and closed may be determined with high accuracy. That is, for example, when the object is a guardrail, collision may be avoided more reliably by appropriately correcting the position of the object. Specifically, when the door is a swing door or a back door of a vehicle, collision at the time of opening the door may be more reliably avoided by using the door locus data together.

Meanwhile, there is a conventional technology of detecting an object based on a change in the intensity of a reflected ultrasonic wave transmitted from a vehicle toward a traveling direction when the vehicle moves. However, this conventional technology has a problem that an object may not be detected unless the vehicle moves. Meanwhile, according to the object detection device 1 of the first embodiment, the position of an object may be calculated with high accuracy even when the vehicle is stationary.

Second Embodiment

Next, a second embodiment will be described. A duplicated description with respect to those similar to the first embodiment will be appropriately omitted. In the second embodiment, the reflection intensity processing unit 213 corrects a reflection intensity to the reflection intensity when an environmental condition is in the standard state based on a predetermined environmental condition.

Here, the environmental condition is, for example, the temperature, the voltage of power supplied to the transmission/reception unit 11, or the temperature of the transmission/reception unit 11. That is, since the reflection intensity may fluctuate according to such an environmental condition, the reflection intensity processing unit 213 corrects a reflection intensity to the reflection intensity when the environmental condition is in the standard state.

Figure 19:
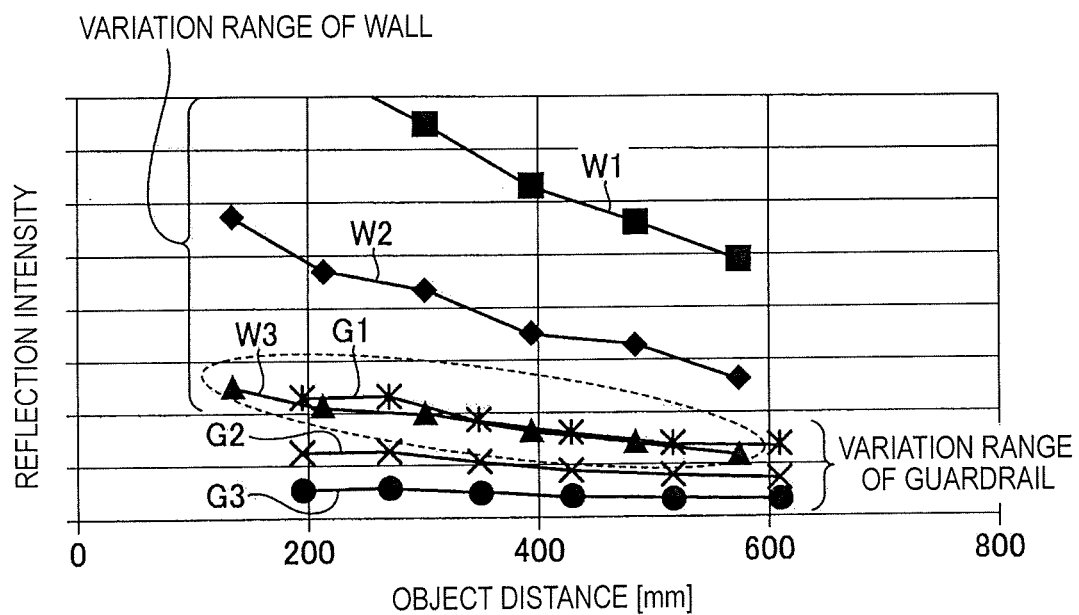
FIG. 19 is a graph illustrating a relationship between the object distance and the reflection intensity (before correction) when an object is a wall and when an object is a guardrail in a second embodiment.

FIG. 19 is a graph illustrating a relationship between the object distance and the reflection intensity (before correction) when an object is a wall and when an object is a guardrail in the second embodiment. As illustrated in FIG. 19, the relationship between the object distance and the reflection intensity when the object is the wall varies according to the environmental condition as indicated by reference symbols W1, W2 and W3. Further, the relationship between the object distance and the reflection intensity when the object is the guardrail G varies according to the environmental condition as indicated by reference symbols G1, G2 and G3.

Accordingly, for example, when the relationship between the object distance and the reflection intensity when the object is the wall is the reference symbol W3 and the relationship between the object distance and the reflection intensity when the object is the guardrail G is the reference symbol G1 according to the environmental condition, it is difficult to distinguish them from each other. Therefore, the reflection intensity processing unit 213 corrects, based on a predetermined environmental condition, each of the reflection intensity in the case of the wall and the reflection intensity the case of the guardrail to the reflection intensity when the environmental condition is in the standard state.

Figure 20:
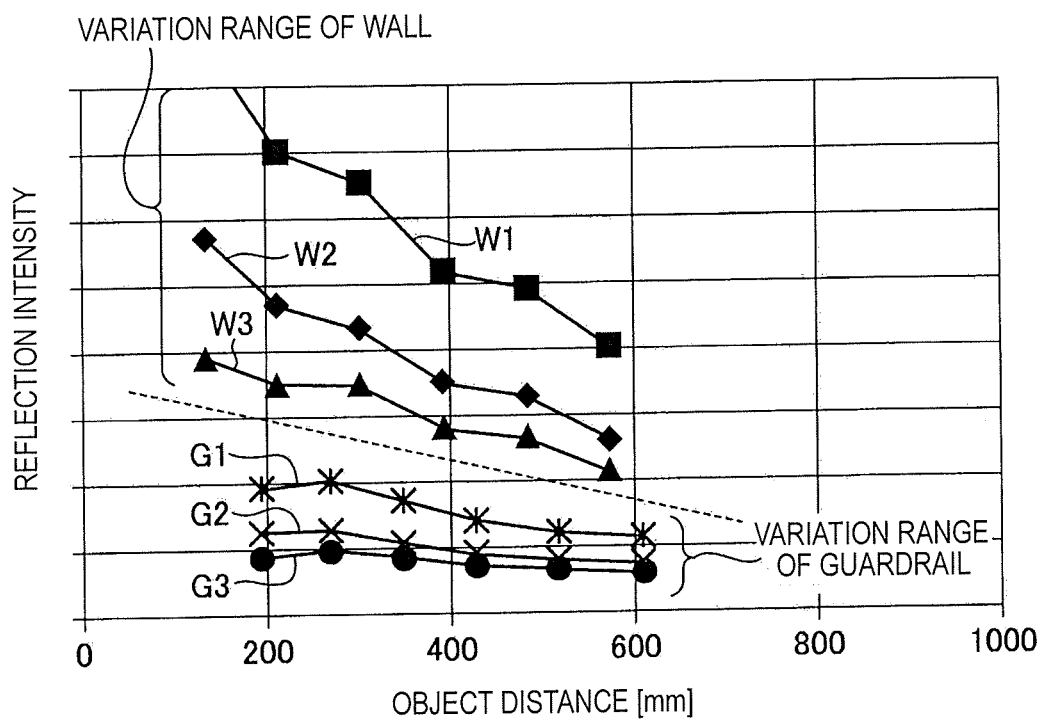
FIG. 20 is a graph illustrating a relationship between the object distance and the reflection intensity (after correction) when an object is a wall and when an object is a guardrail in the second embodiment.

FIG. 20 is a graph illustrating a relationship between the object distance and the reflection intensity (after correction) when an object is a wall and when an object is a guardrail in the second embodiment. As illustrated in FIG. 20, the reference symbols W1, W2 and W3 indicating the relationship between the object distance and the reflection intensity when the object is the wall and the reference symbols G1, G2 and G3 indicating the relationship between the object distance and the reflection intensity when the object is the guardrail G are separated by the above-described correction by the reflection intensity processing unit 213. Thus, the reflection intensity processing unit 213 may accurately distinguish and determine the reflection intensity when the object is the wall and the reflection intensity when the object is the guardrail G.

Figure 21:
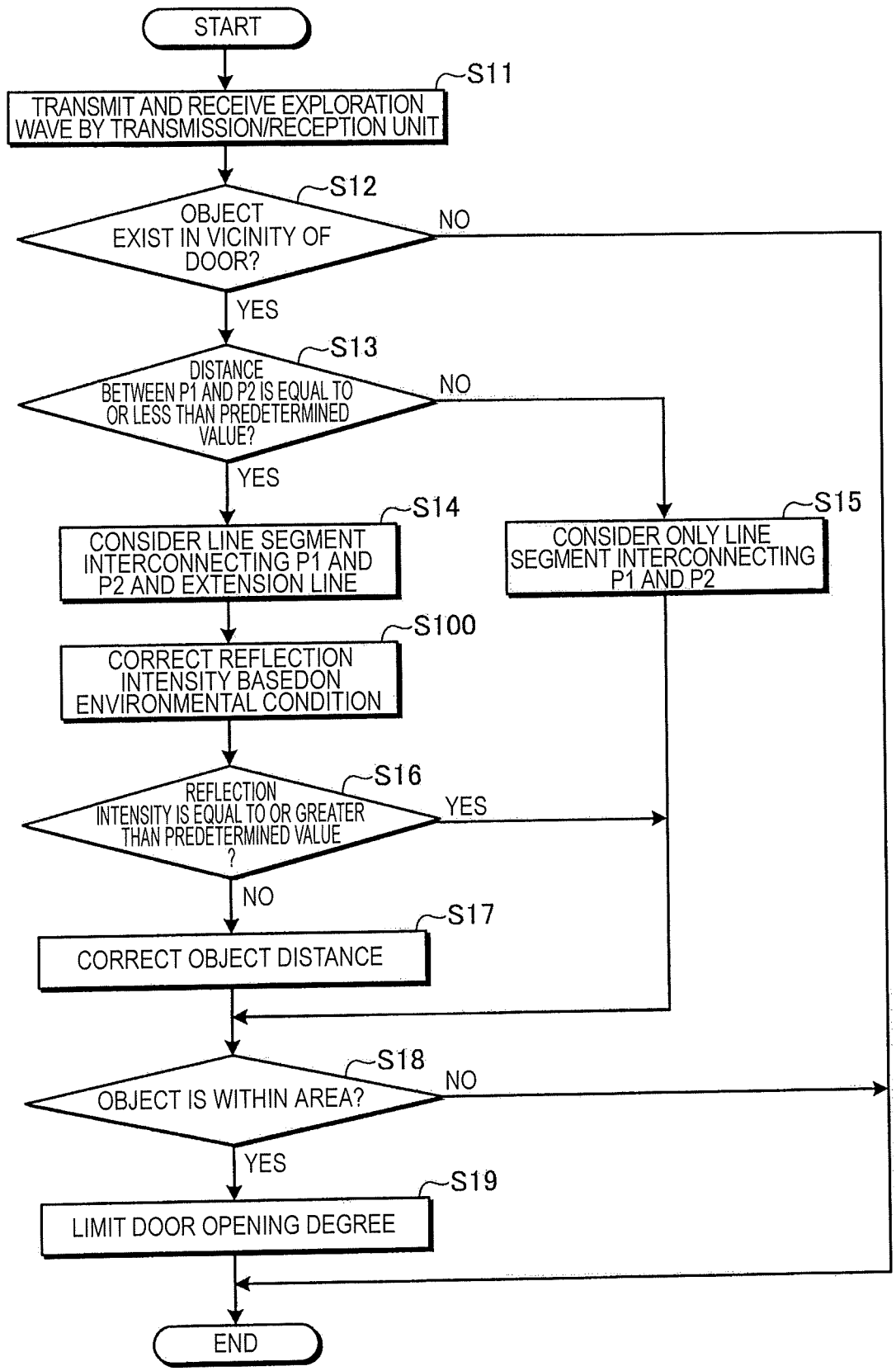
FIG. 21 is a flowchart illustrating the procedure of an object detection processing by the object detection device of the second embodiment.

FIG. 21 is a flowchart illustrating the procedure of an object detection processing by the object detection device 1 of the second embodiment. As compared with the flowchart of FIG. 18, only one difference is that step S100 is added between step S14 and step S16.

In step S100, the reflection intensity processing unit 213 corrects the reflection intensity based on an environmental condition. Then, in the subsequent processing, the corrected reflection intensity may be used.

In this way, according to the object detection device 1 of the second embodiment, it is possible to prevent deterioration in the accuracy of object position calculation due to a change in reflection intensity depending on an environmental condition.

As mentioned above, although the embodiments disclosed here have been illustrated, the embodiments and modifications are merely examples and are not intended to limit the range of this disclosure. The above-described embodiments and modifications may be implemented in various other forms, and various omissions, replacements, combinations, and changes may be made without departing from the scope of this disclosure. Further, the configuration or shape of each embodiment or each modification may be partially exchanged.

For example, in the above-described embodiments, the object detection unit 20 is configured with, for example, one ECU, but is not limited thereto. The object detection unit 20 may be configured with multiple ECUs. At this time, some of the functions of the object detection unit 20 may be performed by one ECU, and the other functions of the object detection unit 20 may be performed by another ECU.

In the above-described embodiments, each of the transmission/reception units 11RFa and 11RFb alternately repeats a period in which the exploration wave is transmitted and received and a period in which the exploration wave is received only, but this disclosure is not limited thereto. In the above-described configuration, the exploration waves T11, T12, T21 and T22 may only need to be detected at least once and the transmission/reception units 11RFa and 11RFb may sequentially detect the exploration waves T11, T12, T21 and T22 once. Alternatively, after the transmission/reception unit 11RFa continuously repeats transmission and reception multiple times and continuously receives the exploration waves T11 and T12 multiple times, the transmission/reception unit 11RFb may continuously repeat transmission and reception multiple times and may continuously receive the exploration waves T21 and T22 multiple times. Alternatively, after the transmission/reception unit 11RFa continuously repeats transmission and reception multiple times and continuously receives the exploration waves T11 and T12 multiple times, the transmission/reception unit 11RFb may perform transmission/reception only once and may receive the exploration waves T21 and T22 only once or vice versa.

In the above-mentioned embodiment, although two transmission/reception units 11 are provided for one door 12, this disclosure is not limited thereto. For example, three or more transmission/reception units may be provided for one door. By increasing the number of transmission/reception units, a wider range of objects may be detected with higher accuracy.

In the above-described embodiment, multiple transmission/reception units 11 are provided in the vehicle 10, but this disclosure is not limited thereto. For example, the transmission/reception unit may be suitably used for all moving objects, the surrounding environment of which changes from time to time due to movement.

Further, the object located so as to be shifted from the center line of the exploration wave is not limited to a guardrail, and may be another object such as a flower bed higher than the lowermost portion of the door 12.

Further, the target object is not limited to the above-described object, and may be, for example, a wire mesh. When the object is a wire mesh, even if the object is located in front of the transmission/reception unit 11, the distance is calculated longer than it actually is since the reflection intensity is low. Therefore, under the condition that the reflection intensity is low, the possibility of collision may be reduced by correcting the distance to the wire mesh to a smaller value so that the distance is close to the actual distance.

An object detection device according to an aspect of this disclosure includes, for example, a first transmission/reception unit and a second transmission/reception unit spaced apart from each other by a predetermined distance in a horizontal direction and configured to transmit an exploration wave and receive the exploration wave reflected by an object and a processing unit configured to calculate a position of the object based on a reception result by the first transmission/reception unit and a reception result by the second transmission/reception unit, in which the processing unit includes a distance processing unit configured to calculate a first point based on the reception result by the first transmission/reception unit and the reception result by the second transmission/reception unit when the first transmission/reception unit transmits the exploration wave, calculate a second point based on the reception result by the first transmission/reception unit and the reception result by the second transmission/reception unit when the second transmission/reception unit transmits the exploration wave, and calculates a separation distance between the first point and the second point, a position calculation unit configured to calculate the position of the object based on the first point and the second point, a reflection intensity processing unit configured to calculate a reflection intensity indicating an intensity of the exploration wave received by the first transmission/reception unit and the second transmission/reception unit, and a position correction unit configured to correct the position of the object based on the separation distance and the reflection intensity. With this configuration, it is possible to improve the accuracy of object position calculation. Specifically, it is possible to appropriately correct the calculated object position based on the separation distance between the first point and the second point and the reflection intensity of the exploration wave.

In the object detection device, for example, the distance processing unit may determine whether or not the separation distance is equal to or greater than a predetermined separation distance threshold, the reflection intensity processing unit may determine whether or not the reflection intensity is equal to or greater than a predetermined reflection intensity threshold, and the position correction unit may correct the position of the object such that a distance to the object is reduced when the separation distance is equal to or greater than the predetermined separation distance threshold in a determination result by the distance processing unit and when the reflection intensity is less than the predetermined reflection intensity threshold in a determination result by the reflection intensity processing unit. With this configuration, it is possible to calculate the object position with high accuracy even when a target object is horizontally long and is located so as to be shifted from the center line of the exploration wave. Specifically, since there is a high possibility of the object position being calculated farther than it actually is when the separation distance between the first point and the second point is large and when the reflection intensity is low, it is possible to appropriately correct the object position.

In the object detection device, for example, the first transmission/reception unit and the second transmission/reception unit may be arranged on an opening/closing unit that is opened and closed, and the object detection device may further include a storage unit configured to store opening/closing locus data of the opening/closing unit and a collision determination unit configured to determine whether or not the opening/closing unit collides with the object when the opening/closing unit is opened and closed based on the position of the object and the opening/closing locus data. With this configuration, it is possible to determine whether or not the opening/closing unit collides with the object when the opening/closing unit is opened and closed with high accuracy.

In the object detection device, for example, the reflection intensity processing unit may correct, based on a predetermined environmental condition, the reflection intensity to a reflection intensity when the environmental condition is in a standard state. With this configuration, it is possible to prevent deterioration in the accuracy of object position calculation due to a change in reflection intensity by the environmental condition.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An object detection device comprising:
    a first transmission/reception unit and a second transmission/reception unit spaced apart from each other by a predetermined distance in a horizontal direction and configured to transmit an exploration wave and receive the exploration wave reflected by an object; and
    a processing unit configured to calculate a position of the object based on a reception result by the first transmission/reception unit and a reception result by the second transmission/reception unit, wherein
    the processing unit includes:
        a distance processing unit configured to calculate a first point based on the reception result by the first transmission/reception unit and the reception result by the second transmission/reception unit when the first transmission/reception unit transmits the exploration wave, calculate a second point based on the reception result by the first transmission/reception unit and the reception result by the second transmission/reception unit when the second transmission/reception unit transmits the exploration wave, and calculates a separation distance between the first point and the second point;
        a position calculation unit configured to calculate the position of the object based on the first point and the second point;
        a reflection intensity processing unit configured to calculate a reflection intensity indicating an intensity of the exploration wave received by the first transmission/reception unit and the second transmission/reception unit; and
        a position correction unit configured to correct the position of the object based on the separation distance and the reflection intensity.

2. The object detection device according to claim 1, wherein
    the distance processing unit determines whether or not the separation distance is equal to or greater than a predetermined separation distance threshold,
    the reflection intensity processing unit determines whether or not the reflection intensity is equal to or greater than a predetermined reflection intensity threshold, and
    the position correction unit corrects the position of the object such that a distance to the object is reduced when the separation distance is equal to or greater than the predetermined separation distance threshold in a determination result by the distance processing unit and when the reflection intensity is less than the predetermined reflection intensity threshold in a determination result by the reflection intensity processing unit.

3. The object detection device according to claim 1, wherein
    the first transmission/reception unit and the second transmission/reception unit are arranged on an opening/closing unit that is opened and closed, and
    the object detection device further comprises:
        a storage unit configured to store opening/closing locus data of the opening/closing unit; and
        a collision determination unit configured to determine whether or not the opening/closing unit collides with the object when the opening/closing unit is opened and closed based on the position of the object and the opening/closing locus data.

4. The object detection device according to claim 1, wherein
the reflection intensity processing unit corrects, based on a predetermined environmental condition, the reflection intensity to a reflection intensity when the environmental condition is in a standard state.

* * * * *